(12) United States Patent
Yamaoka et al.

(10) Patent No.: US 6,408,504 B2
(45) Date of Patent: Jun. 25, 2002

(54) PROCESS AND APPARATUS FOR ASSEMBLING VEHICLE BODY FRAME FOR MOTORCYCLE

(75) Inventors: Naoji Yamaoka; Hidekazu Ryu; Teiji Miwa; Isamu Ishizaki; Hisashi Hoshi, all of Sayama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/865,713

(22) Filed: May 29, 2001

(30) Foreign Application Priority Data

| May 30, 2000 | (JP) | 2000-164757 |
|---|---|---|
| May 30, 2000 | (JP) | 2000-164758 |
| May 30, 2000 | (JP) | 2000-164759 |
| May 30, 2000 | (JP) | 2000-164760 |

(51) Int. Cl.[7] .............................................. B23P 21/00
(52) U.S. Cl. .............................. 29/709; 29/783; 29/791; 29/281.1; 29/281.5; 29/281.6; 29/897.2; 29/407.1; 29/467; 29/559
(58) Field of Search .................... 29/897.2, 407.09, 29/407.1, 428, 464, 467, 468, 525.14, 559, 33 K, 700, 709, 783, 787, 791, 795, 281.1, 281.4, 281.5, 281.6; 269/37, 287, 909; 219/158, 161; 228/212

(56) References Cited

U.S. PATENT DOCUMENTS 3,968,558 A * 7/1976 Sekine et al.
5,107,577 A * 4/1992 Jackson et al.
5,400,943 A * 3/1995 Rossi
5,855,060 A * 1/1999 Hollebrands et al.
5,870,809 A * 2/1999 Nishi
5,940,961 A * 8/1999 Parete
6,293,454 B1 * 9/2001 Zhang et al.

FOREIGN PATENT DOCUMENTS

JP 4-749 1/1992

* cited by examiner

Primary Examiner—S. Thomas Hughes
Assistant Examiner—T. Nguyen
(74) Attorney, Agent, or Firm—Arent Fox Kintner Plotkin & Kahn, PLLC

(57) ABSTRACT

In assembling a vehicle body frame for a motorcycle by welding front and rear frame subassemblies to each other, the following steps are carried out: a step of positioning left and right rear portions of the front frame subassembly by a pair of front positioning device movable at least in a widthwise direction of the vehicle body frame, a step of clamping a head pipe by a front clamp device which is capable of being moved in vertical and longitudinal directions of the vehicle body frame and is capable of being tilted longitudinally, a step of positioning left and right rear portions of the rear frame subassembly by a pair of rear positioning device movable in the longitudinal, widthwise and vertical directions of the vehicle body frame, a step of clamping left and right front portions of the rear frame subassembly by a pair of rear clamp means movable in the longitudinal, widthwise and vertical directions of the vehicle body frame, and a step of welding the front and rear frame subassemblies to each other. Thus, it is possible to provide general-purpose properties to reduce the equipment cost.

7 Claims, 17 Drawing Sheets

PROCESS AND APPARATUS FOR ASSEMBLING VEHICLE BODY FRAME FOR MOTORCYCLE

BACKGROUND OF THE INVENTION

1. Field of the Invention

The present invention relates to improvements of a process and apparatus for assembling a vehicle body frame for a motorcycle by welding a front frame subassembly having a head pipe at a front end thereof and a rear frame subassembly to each other.

2. Description of the Related Art

A process for assembling a vehicle body frame for a motorcycle is conventionally known from Japanese Patent Publication No.4-749, for example. In this process, a center member such as a head pipe and a cross member is retained by a center jig, and left and right side frame members forming a vehicle body frame in cooperation with the center member are retained by a pair of left and right side jigs, respectively. In a state in which both of the side jigs have been righted, the side members are welded to opposite sides of the center member to assemble the vehicle body frame.

In the above conventionally known process, however, an exclusive center jig and exclusive side jigs corresponding to the type of the vehicle body frame are required. To assemble a plurality of types of vehicle body frames for motorcycles, center jigs and side jigs corresponding to the types must be prepared, resulting in an increased equipment cost.

SUMMARY OF THE INVENTION

The present invention has been accomplished in view of the above circumstances, and it is an object of the present invention to provide a process and apparatus for assembling a vehicle body frame for a motorcycle, wherein the general-purpose properties are provided to accommodate the assembling of any of a plurality of types of vehicle body frames for motorcycles, thereby providing a reduction in equipment cost.

To achieve the above object, according to a first aspect and feature of the present invention, there is provided a process for assembling a vehicle body frame for a motorcycle by welding a front frame subassembly having a head pipe at a front end thereof and a rear frame subassembly to each other to assemble the vehicle body frame for the motorcycle, comprising a first step of positioning left and right rear portions of the front frame subassembly by a pair of front positioning means movable at least in a direction of a Y-axis established in a widthwise direction of the vehicle body frame, a second step of clamping the head pipe at the front end of the front frame subassembly by a front clamp means which is capable of moving in directions of Z- and X-axes established in vertical and longitudinal directions of the vehicle body frame, and is capable of tilting about an axis extending along the Y-axis, a third step of positioning left and right rear portions of the rear frame subassembly by a pair of rear positioning means movable in the directions of the X-, Y- and Z-axes, a fourth step of clamping left and right front portions of the rear frame subassembly by a pair of rear clamp means movable in the directions of the X-, Y- and Z-axes, and a fifth step of welding the rear frame subassembly positioned relative to the front frame subassembly and the front frame subassembly to each other.

With such process, the pair of front positioning means for positioning the left and right rear portions of the front frame subassembly are movable at least in the widthwise direction of the vehicle body frame for the motorcycle, and the front clamp means for clamping the head pipe at the front end of the front frame subassembly is movable in the longitudinal and vertical directions of the vehicle body frame for the motorcycle and tiltable in the longitudinal direction of the vehicle body frame. Therefore, in a state in which the left and right rear portions of the front frame subassembly have been positioned by the front positioning means, changes in position and attitude of the head pipe caused by the change in type of the front frame subassembly can be covered by the movement of the front clamp means in the longitudinal and vertical directions and the tilting of the front clamp means about the Y-axis, whereby the front frame subassembly can be positioned and supported with a good accuracy. In addition, the pair of rear positioning means for positioning the left and right rear portions of the rear frame subassembly are movable in the longitudinal, widthwise and vertical directions of the vehicle body frame for the motorcycle, and the pair of rear clamp means for clamping the left and right front portions of the rear frame subassembly are movable in the longitudinal, widthwise and vertical directions of the vehicle body frame for the motorcycle. Therefore, even if the type of the rear frame subassembly is changed, the rear frame subassembly can be positioned and supported with a good accuracy relative to the front frame subassembly, thereby providing general-purpose properties to accommodate the assembling of any of a plurality of types of vehicle body frames for motorcycles, leading to a reduction in equipment cost. Moreover, the vehicle body frame having a stable welding accuracy can be assembled by welding the front and rear frame subassemblies positioned with a good accuracy relative to each other. Additionally, the rear frame subassembly is restrained while being positioned accurately relative to the front frame subassembly by the pair of rear positioning means and the pair of rear clamp means. Therefore, even if a welding strain has been produced in the rear frame subassembly, such strain can be corrected to assemble the vehicle body frame for the motorcycle with a good accuracy.

According to a second aspect and feature of the present invention, there is provided an apparatus for assembling a vehicle body frame for a motorcycle by welding a front frame subassembly having a head pipe at a front end thereof and a rear frame subassembly to each other, comprising a pair of front positioning means capable of positioning left and right rear portions of the front frame subassembly, a front clamp means capable of clamping the head pipe at the front end of the front frame subassembly, a pair of rear positioning means capable of positioning left and right rear portions of the rear frame subassembly, a pair of rear clamp means capable of clamping left and right front portions of the rear frame subassembly, a pair of front positioning drive means for moving the front positioning means at least in a direction of a Y-axis established in a widthwise direction of the vehicle body frame, respectively, a front clamp drive means which is capable of moving the front clamp means in directions of Z- and X-axes established in vertical and longitudinal directions of the vehicle body frame, and is capable of tilting the front clamp means about an axis extending along the Y-axis, a pair of rear positioning drive means capable of moving the rear positioning means in the directions of X-, Y- and Z-axes, respectively, a pair of rear clamp drive means capable of moving the rear clamp means in the directions of X-, Y- and Z-axes, respectively, and a control unit for controlling the operations of the drive means, so that the front positioning means, the front clamp means, the rear positioning means and the rear clamp means are brought into positions previously determined depending on the type of the vehicle body frame for the motorcycle, which is to be assembled.

With the arrangement of the second feature, the pair of front positioning means, the front clamp means, the pair of rear positioning means and the pair of rear clamp means are moved automatically to the positions corresponding to the vehicle body frame in accordance with the change in type of the vehicle body frame for the motorcycle, which is to be assembled. Therefore, the process of the first feature can be carried out appropriately with an enhanced efficiency of assembling of the vehicle body frame for the motorcycle.

According to a third aspect and feature of the present invention, in addition to the second feature, the front clamp means includes a plurality of supporting pins capable of being fitted into lower ends of a plurality of types of head pipes, a pin-supporting plate for fixedly supporting one of the supporting pins, while disposing the pin at a location below the head pipe, a pushing member capable of being brought into engagement with an upper end of the head pipe fitted at a lower end thereof over one of the supporting pins, irrespective of the type of the head pipe, thereby clamping the head pipe between the pushing member and the one of the supporting pins, and a cylinder for providing pushing force for pushing the head pipe from above to the pushing member.

With the arrangement of the third feature, the head pipe can be clamped between the supporting pin selected depending on the head pipe to be retained and the pushing member corresponding to any of the plurality of types of head pipes, thereby providing general-purpose properties to accommodate the assembling of any of the plurality of types of vehicle body frames for motorcycles, leading to a reduction in equipment cost.

According to a fourth aspect and feature of the present invention, in addition to the third feature, the apparatus further includes an arm, at one end of which the pushing member is mounted, the cylinder being disposed at a fixed position to have an axis parallel to an axis of the head pipe and connected to the other end of the arm through a connecting pin, a cam plate fixedly disposed with a position thereof fixed relative to the cylinder, and having a cam bore comprising a first bore portion extending in parallel to the axis of the head pipe, and a second bore portion connected to an upper end of the first bore portion and inclined in such a direction that the second bore portion is more spaced apart from the head pipe at an upper location, and a roller supported at an intermediate portion of the arm and capable of being rolled within the cam bore.

With the arrangement of the fourth feature, as the roller is rolled within the cam bore in response to the expansion and contraction of the cylinder, the arm is turned about the connecting pin, while moving along with the connecting pin. In this case, a lower portion of the cam bore is defined as the first bore portion extending in parallel to the axis of the head pipe, and hence, when the roller is rolled within the first bore portion, the arm and thus the pushing member are also moved in parallel to the axis of the head pipe. Therefore, when the upper end of the head pipe is pushed by the pushing member, the movement of the pushing member can be in a direction along the axis of the head pipe and thus, the head pipe can be clamped stably and reliably between the supporting pin and the pushing member in spite of the change in length of the head pipe.

According to a fifth aspect and feature of the present invention, in addition to the third or fourth feature, the pin-supporting plate is disposed at a location below the head pipe for turning movement about the axis parallel to the axis of the head pipe; the supporting pins individually corresponding to the plurality of types of head pipes are fixed to the pin-supporting plate, so that the supporting pins are disposed at a plurality of locations equally spaced apart from one another in a circumferential direction of the pin-supporting plate; and the apparatus further includes an index mechanism connected to the pin-supporting plate to alternatively bring one of the plurality of supporting pins to a position below the head pipe. With such arrangement, in accordance with the change in type of the vehicle body frame for the motorcycle, which is to be assembled, the supporting pin corresponding to the head pipe can be selected automatically and brought to the position below the head pipe, leading to an enhanced assembling efficiency.

According to a sixth aspect and feature of the present invention, in addition to the second feature, each of the front positioning means and the rear positioning means includes a guide wall which has a guide bore corresponding to a positioning bore provided in a positioned member forming a portion of the front frame subassembly or the rear frame subassembly to extend in a widthwise direction of the vehicle body frame, the guide wall being opposed to an outer side surface of the positioned member in a position where the guide bore corresponds to the positioning bore, a cylinder disposed coaxially with an axis of the guide bore on a side of the guide wall opposite from the positioned member, a plurality of movable rods which are capable of being fitted into the guide bore for selective interposition as well as removable insertion between the cylinder and the guide wall, each of the movable rods being releasably connected at one end thereof to the cylinder, and a plurality of types of positioning pins, each of which is formed into such a shape as to be capable of fitting into the positioning bore in any of a plurality of types of the positioned members, the positioning pins being individually fixed to the other ends of the movable rods.

With the arrangement of such sixth feature, one of the plurality of movable rods, which has the positioning pin corresponding to the type of the positioned member, is selected and brought to between the cylinder and the guide wall and removably fitted into the guide bore by connection with the cylinder. Thus, the positioning pin corresponding to the positioning bore in the positioned member can be fitted properly into the guide bore to position a frame member, thereby providing general-purpose properties to accommodate the assembling of any of the plurality of types of vehicle body frames for motorcycles, leading to a reduction in equipment cost.

According to a seventh aspect and feature of the present invention, in addition to the sixth feature, the apparatus further includes a rod-supporting plate disposed between the guide wall and the cylinder for turning movement about an axis parallel to the axis of the guide bore, the movable rods being disposed at the locations equally spaced apart from one another in the circumferential direction of the rod-supporting plate and retained on the rod-supporting plate for sliding movement in a direction parallel to the axis of the guide bore, and an index motor connected to the rod-supporting plate for driving the rod-supporting plate in turning movement, so that one of the movable rods can be alternatively brought to a position between the cylinder and the guide bore. With such arrangement, it is possible to provide, in a simple structure, an arrangement designed so that one of the plurality of types of positioning pins is selected in correspondence to a frame member to be positioned, and is brought to a position where it corresponds to the guide bore with a good accuracy.

According to an eighth aspect and feature of the present invention, in addition to the second feature, the rear clamp means formed to clamp and retain a pipe-shaped frame member forming a portion of the vehicle body frame and extending in the substantially longitudinal direction of the vehicle body frame includes a movable support which is capable of being moved in the longitudinal, widthwise and vertical directions of the vehicle body frame and is capable of being stopped at any position, a receiving member which is formed into a substantially V-shape to open upwards in a plane intersecting a lengthwise direction of the frame member, and is fixed to the movable support so as to be disposed below the frame member, a pushing member supported on the movable support for swinging movement in such plane to sandwich the frame member between the pushing member and the receiving member, and a drive mechanism provided between the movable support and the pushing member to drive the pushing member in swinging movement, each of surfaces of the receiving member and the pushing member opposed to the frame member being formed into such a shape as to be brought into spherical contact with the frame member.

With the arrangement of such eighth feature, the movable support is capable of being moved in the three-dimensional directions and stopped at any position. Therefore, the frame member can be clamped in spite of the change in outside diameter thereof by fixedly disposing the substantially V-shaped receiving member below the frame member at a location corresponding to the type of the frame member to be clamped, and by swinging the pushing member to sandwich the frame member between the pushing member and the receiving member. Moreover, the receiving member and the pushing member are brought into a spherical contact with the frame member and hence, even if the angle formed by the lengthwise direction of the frame member and a plane in which the receiving member and the pushing member are disposed is varied to some extent, the frame member can be reliably clamped between the receiving member and the pushing member. Therefore, it is possible to provide general-purpose properties to accommodate the assembling of any of a plurality of types of vehicle body frames for motorcycles, leading to a reduction in equipment cost.

The above and other objects, features and advantages of the invention will become apparent from the following description of the preferred embodiment taken in conjunction with the accompanying drawings.

BRIEF DESCRIPTION OF THE DRAWINGS

FIGS. 1 to 9 show an embodiment of the present invention, wherein

FIG. 1 is a perspective view of one example of a vehicle body frame for a motorcycle;

FIG. 2 is a vertical sectional view of an assembling apparatus, taken along a line 2—2 in FIG. 3;

FIG. 3 is a view taken in the direction of an arrow 3 in FIG. 2, showing an upper half in an operated state and a lower half in a non-operated state;

FIG. 4 is an enlarged sectional view taken along a line 4—4 in FIG. 3;

FIG. 5 is an enlarged view taken in the direction of an arrow 5 in FIG. 3;

FIG. 6 is a sectional view taken along a line 6—6 in FIG. 5;

FIG. 7 is a sectional view taken along a line 7—7 in FIG. 5;

FIG. 8 is a sectional view taken along a line 8—8 in FIG. 7;

FIG. 9 is a sectional view taken along a line 9—9 in FIG. 6;

DESCRIPTION OF THE PREFERRED EMBODIMENT

Figure 1:
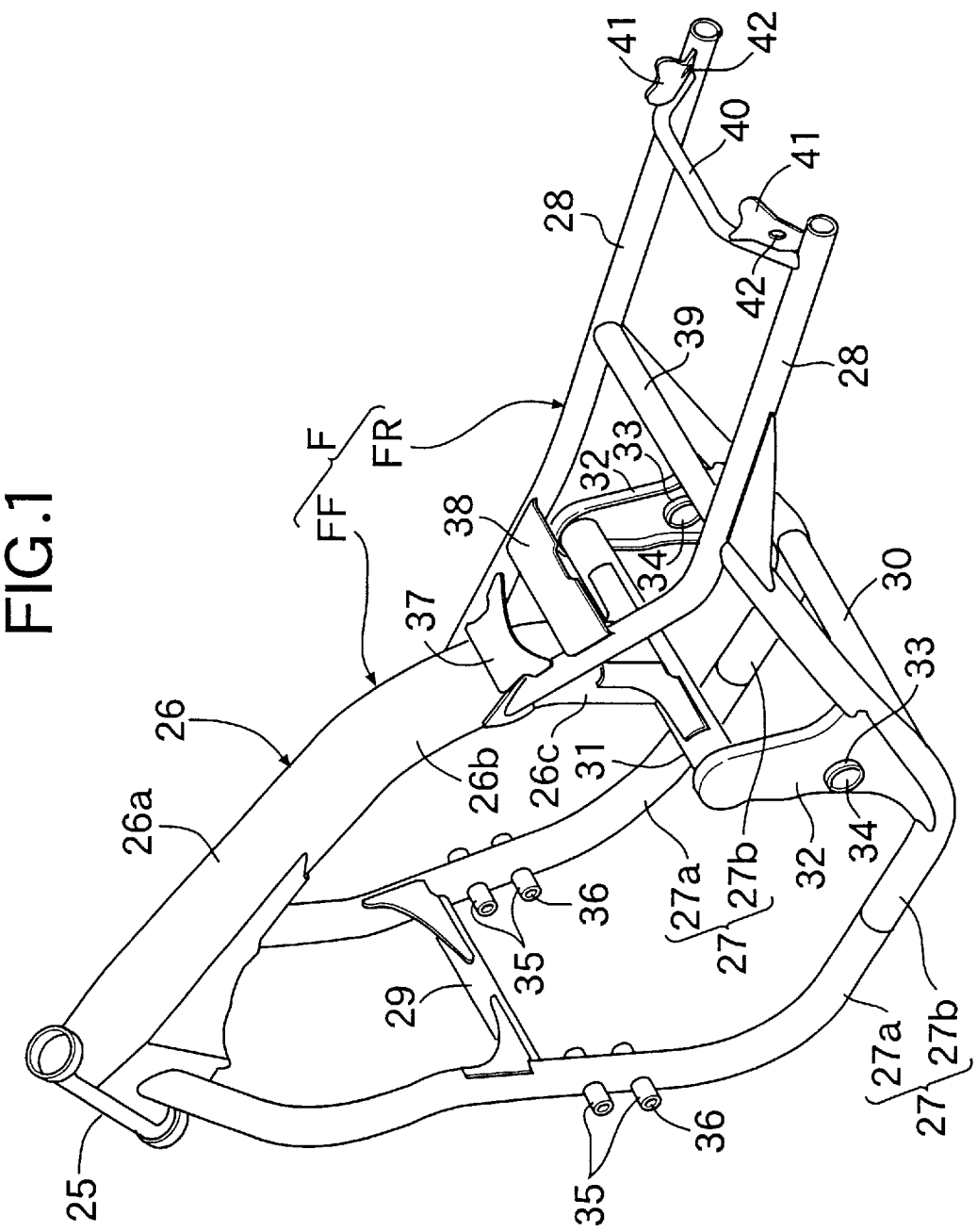

The present invention will now be described by way of an embodiment with reference to FIGS. 1 to 19. Referring first to FIG. 1, a vehicle body frame F for a motorcycle is comprised of a front frame subassembly FF including a head pipe 25, a single main pipe 26 extending rearwards from the head pipe 25, and a pair of left and right down-tubes 27, 27 connected at their front ends to the head pipe 25 below the main pipe 26; and a rear frame subassembly FR including sheet rails 28, 28 as a pair of left and right frame members which are welded at their front ends to a rear portion of the main pipe 26 and to which rear ends of the down-tubes 27, 27 are welded, respectively.

The main pipe 26 is formed so as to be integrally provided with a rearward-inclined portion 26a extending rearwards and downwards from the head pipe 25, and a descending portion 26c connected to a rear end of the rearward-inclined portion 26a through a curved portion 26b and extending downwards. The down-tube 27 is formed into a substantially U-shape with its upper portion opened by a first tubular portion 27a declined rearwards from the head pipe 25 and having a rear end formed substantially horizontally, a second tubular portion 27b welded at its substantially horizontal front end to a rear end of the first tubular portion 27a and having a rear portion inclined rearwards and upwards. A cross member 29 is mounted between the first tubular portions 27a, 27a of the down-tubes 27, 27, and a cross member 30 is mounted between the second tubular portions 27b, 27b of the down-tubes 27, 27.

A cross member 31 is connected at its central portion to a rear end of the main pipe 26 and more specifically, to a lower end of the descending portion 26c, and at its opposite ends to a pair of left and right plate-shaped front support members 32, 32 as members to be positioned. Each of the front support members 32, 32 is secured to an intermediate portion of each of the second tubular portions 27b, 27b of the down-tubes 27, 27. Support tubes 33, 33 for swingably supporting front ends of swing arms supporting rear wheels are secured to the front support members 32, 32, and through-bores functioning as positioning bores 34, 34 for determining the positions of the front support members 32, 32 in assembling the vehicle body frame F are defined in the support tubes 33, 33 with their opposite ends opened.

A pair of support tubes 35, 35 for supporting a power unit (not shown) or the like are secured to each of the first tubular portions 27a, 27a of the down-tubes 27, 27, and through-bores functioning as positioning bores 36, 36 for determining the positions of the down-tubes 27, 27 in assembling the vehicle body frame F are defined, with their opposite ends opened in lower two, for example, of the support tubes 35, 35.

In the rear frame subassembly FR, cross members 37, 38, 39 and 40 are mounted in the named order from the front side between the sheet rails 28, 28, and plate-shaped rear support members 41, 41 as members to be positioned are secured to the sheet rails 28, 28 adjacent the rearmost cross member 40 to support tail lamps, brake lamps or the like. Moreover, through-bores functioning as positioning bores 42, 42 for determining the rear positions of the sheet rails 28, 28 in assembling the vehicle body frame F are provided, with their opposite ends opened, in the rear support members 41, 41.

Such rear frame subassembly FR is assembled to the front frame subassembly FF in such a manner that the sheet rails 28, 28 are welded at their front ends to an upper portion of the descending portion 26c of the main pipe 26 of the front frame subassembly FF, and at their intermediate portions to the rear ends, i.e., upper ends of the second tubular portions 27b, 27b of the down-tubes 27, 27 of the front frame subassembly FF, thereby forming the vehicle body frame F for the motorcycle.

Figure 2:
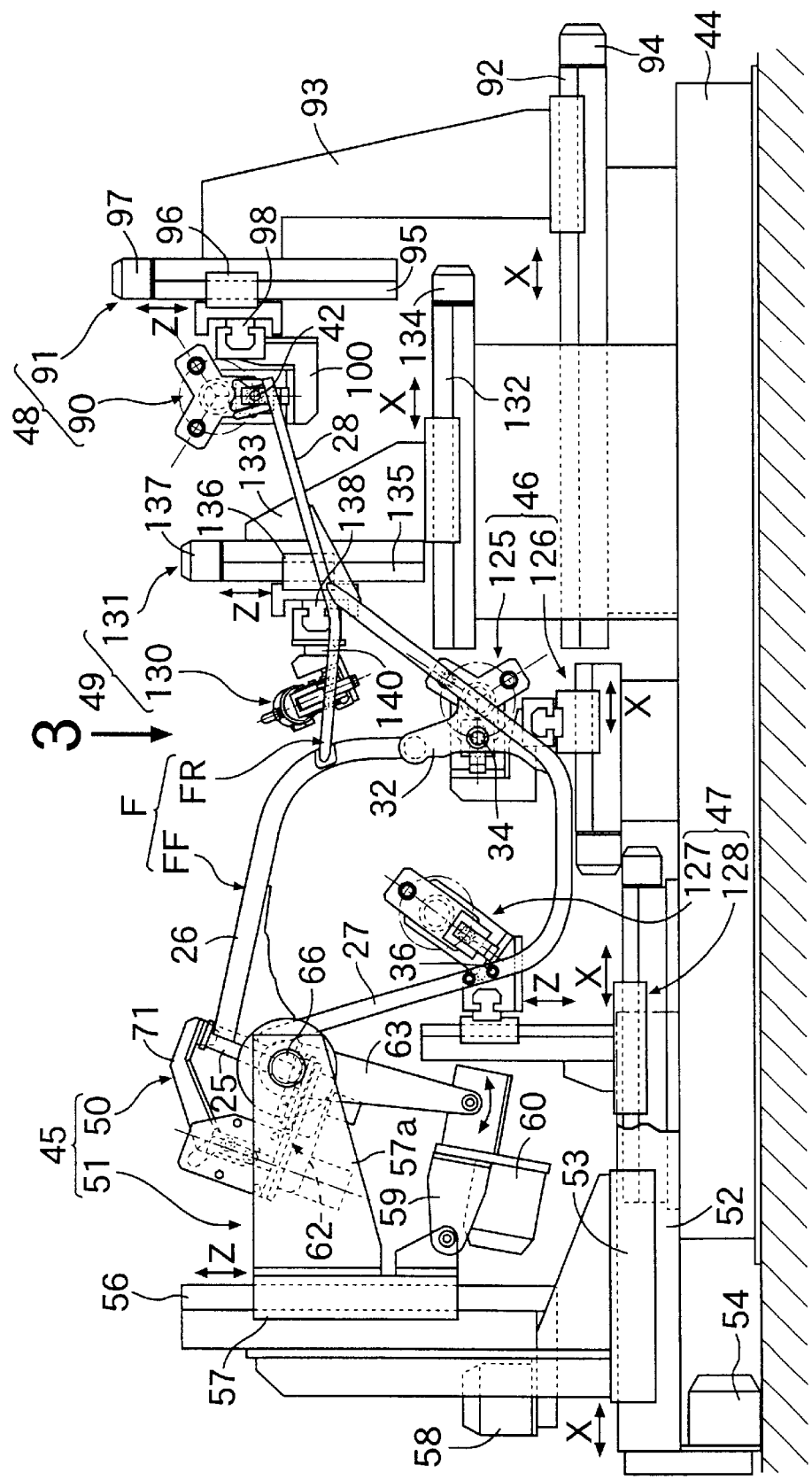
Figure 3:
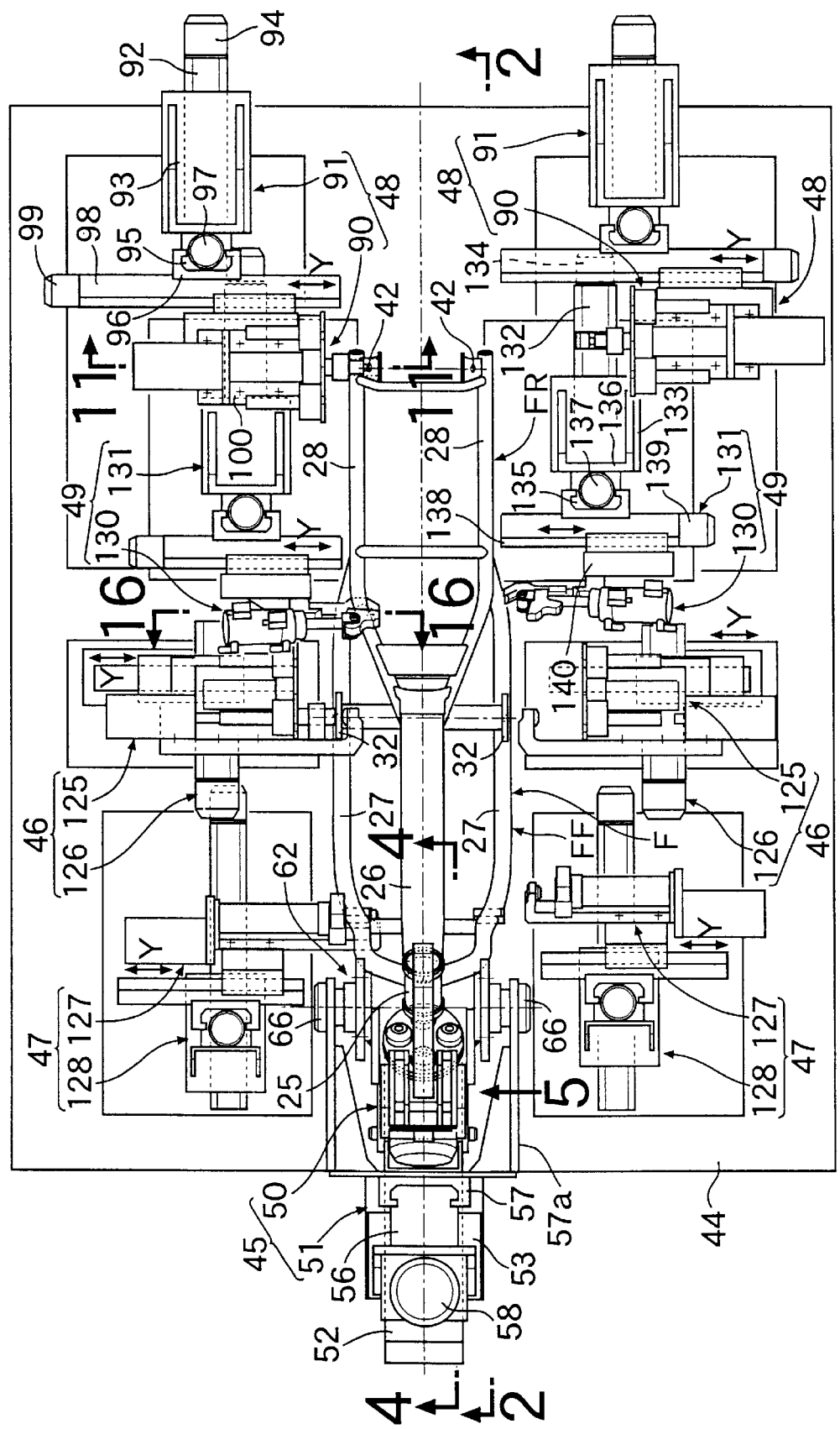
Figure 4:
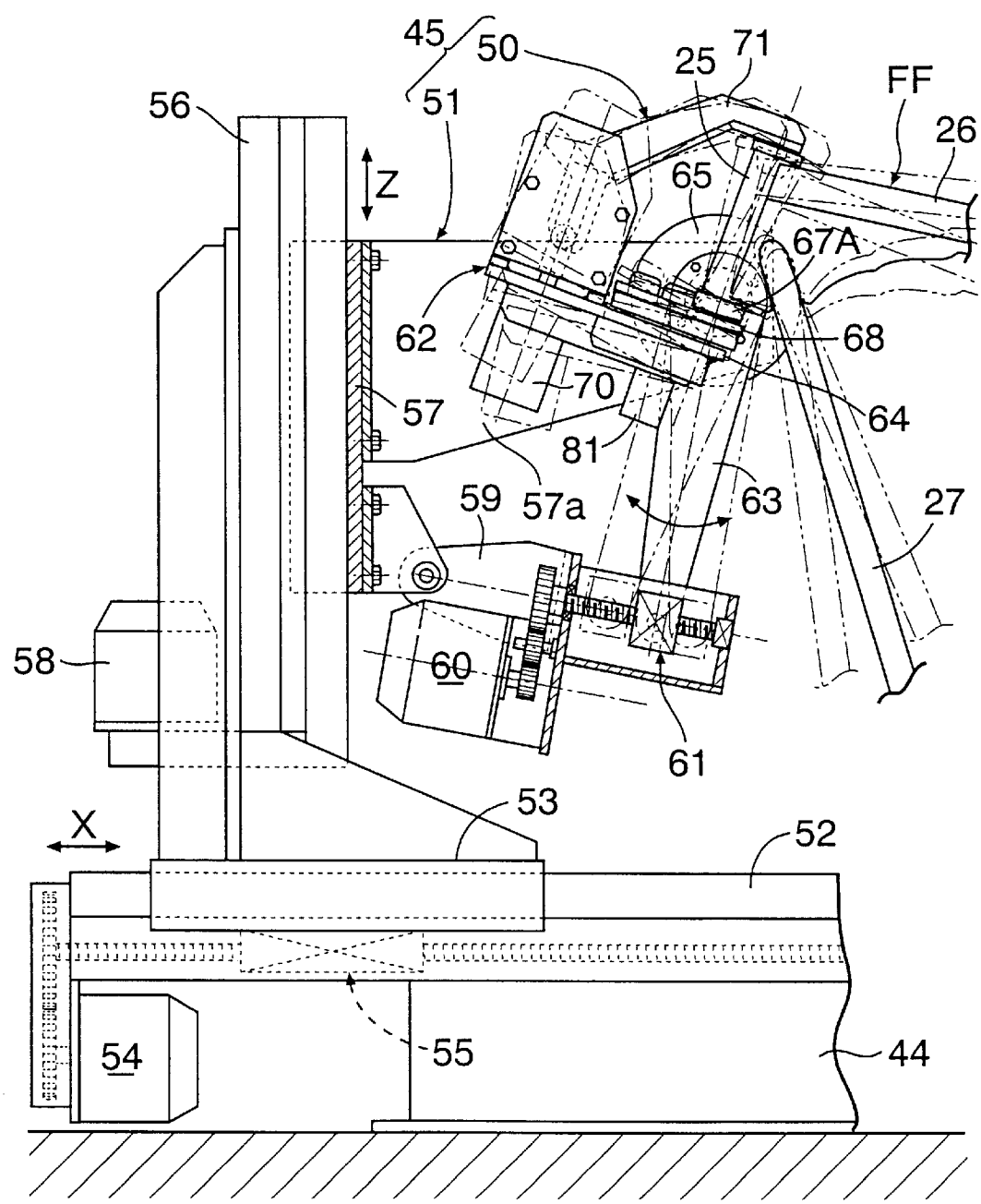

Referring to FIGS. 2 and 3, an assembling apparatus for welding the front and rear frame subassemblies FF and FR to each other to form the vehicle body frame F includes a base 44, so that the front and rear frame subassemblies FF and FR are welded to each other on the base 44.

Disposed on the base 44 are a head pipe retaining device 45 for retaining the head pipe 25 provided at the front end of the front frame subassembly FF in a clamping manner, a pair of left and right front support member-positioning devices 46, 46 for positioning the front support members 32, 32 provided at the rear portion of the front frame subassembly FF, a pair of left and right down-tube positioning devices 47, 47 for positioning front portions of the down-tubes 27, 27 provided on the front frame subassembly FF, a pair of left and right rear support member-positioning devices 48, 48 for positioning the rear support members 41, 41 provided at the rear ends of the rear frame subassembly FR, and a pair of left and right sheet rail retaining devices 49, 49 for retaining the front portions of the sheet rails 28, 28 provided on the rear frame subassembly FR in a clamping manner.

The head pipe retaining device 45 is comprised of a front clamp means 50 disposed on a movable support frame 62 for clamping the head pipe 25 from above and below, and a front clamp drive means 51 capable of moving the front clamp means 50 in a direction of an X-axis which is a longitudinal direction of the vehicle body frame F which is assembled on the base 44 and in a direction of a Z-axis which is a vertical direction of the vehicle body frame F, and tilting the front clamp means 50 forwards and rearwards.

Referring to FIGS. 4 to 8, the front clamp drive means 51 includes a rail 52 fixed on the base 44 to extend along the direction of the X-axis, a carriage 53 movable on the rail 52, an electric motor 54 fixedly disposed on the base 44 and having an axis extending in the direction of the X-axis, a screw-feeding mechanism 55 provided between the electric motor 54 and the carriage 53 to convert the rotational force of the electric motor 54 into a linear driving force in the direction of the X-axis for the carriage 53, a rail 56 provided on the carriage 53 to extend in the direction of the Z-axis, i.e., in a vertical direction, an elevator 57 which is capable of being lifted and lowered along the rail 56, and has a bracket 57a for supporting a movable support frame 62 with the front clamp means 50 disposed thereon for tilting movement about the Y-axis that is a widthwise direction of the vehicle body frame F, an electric motor 58 fixedly disposed on the carriage 53 and having an axis extending along the Z-axis, a screw feeding mechanism (not shown) provided between the electric motor 58 and the elevator 57 to convert the rotational force of the electric motor 58 into a linear driving force in the direction of the Z-axis for the elevator 57, a turnable frame 59 connected to a lower portion of the elevator 57 for turning movement about an axis extending along the Y-axis, an electric motor 60 fixedly disposed on the turnable frame 59 and having an axis disposed in an X-Y plane, arms 63, 63 extending downwards from the movable support frame 62, and a screw feeding mechanism 61 provided between the electric motor 60 and lower ends of arms 63, 63 to convert the rotational force of the electric motor 60 into a reciprocally turning force for the pair of arms 63, 63.

With such front clamp drive means 51, the movable support framer 62 of the front clamp means 50 can be moved longitudinally and vertically of the vehicle body frame F and moreover, can be tilted about the axis provided by the Y-axis. Thus, according to a change in type of the vehicle body frame F, to accommodate changes in position of the head pipe 25 in the direction of the X-axis, in height of the head pipe 25 from the base 44 and in inclination angle of the head pipe 25, the front clamp means 50 can be moved to any position corresponding to the position of the head pipe 25.

The movable support frame 62 includes a frame plate 64 connected at right angles to the arms 63, 63, extendable upwards and downwards, at locations nearer to their upper portions, and circular turnable plates 65, 65 connected to upper ends of the arms 63, 63. The turnable plates 65, 65 are carried at their central portions on a bracket 57a of the elevator 57 through support shafts 66, 66 extending in the direction of the Y-axis.

Figure 9:
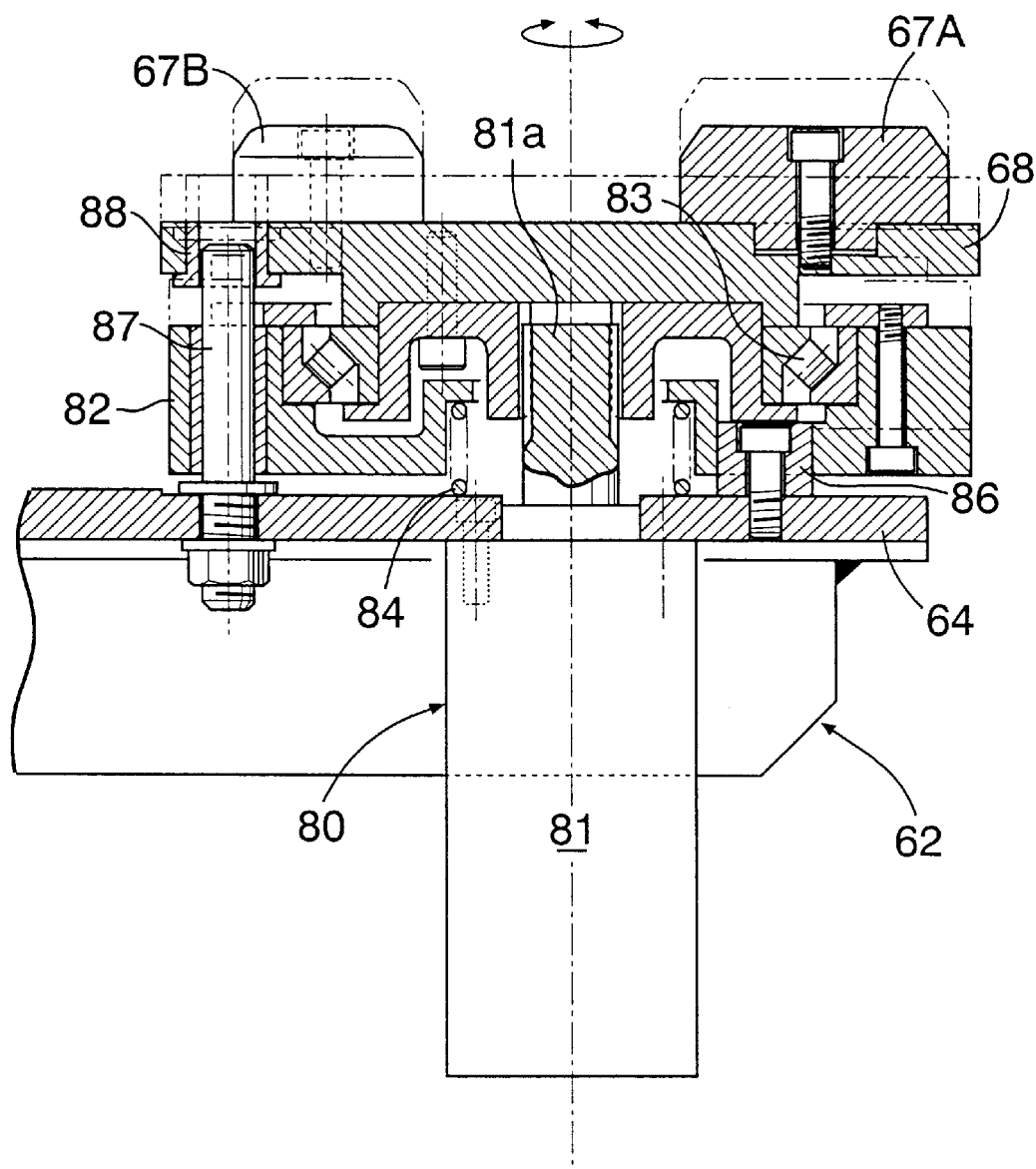
Figure 10:
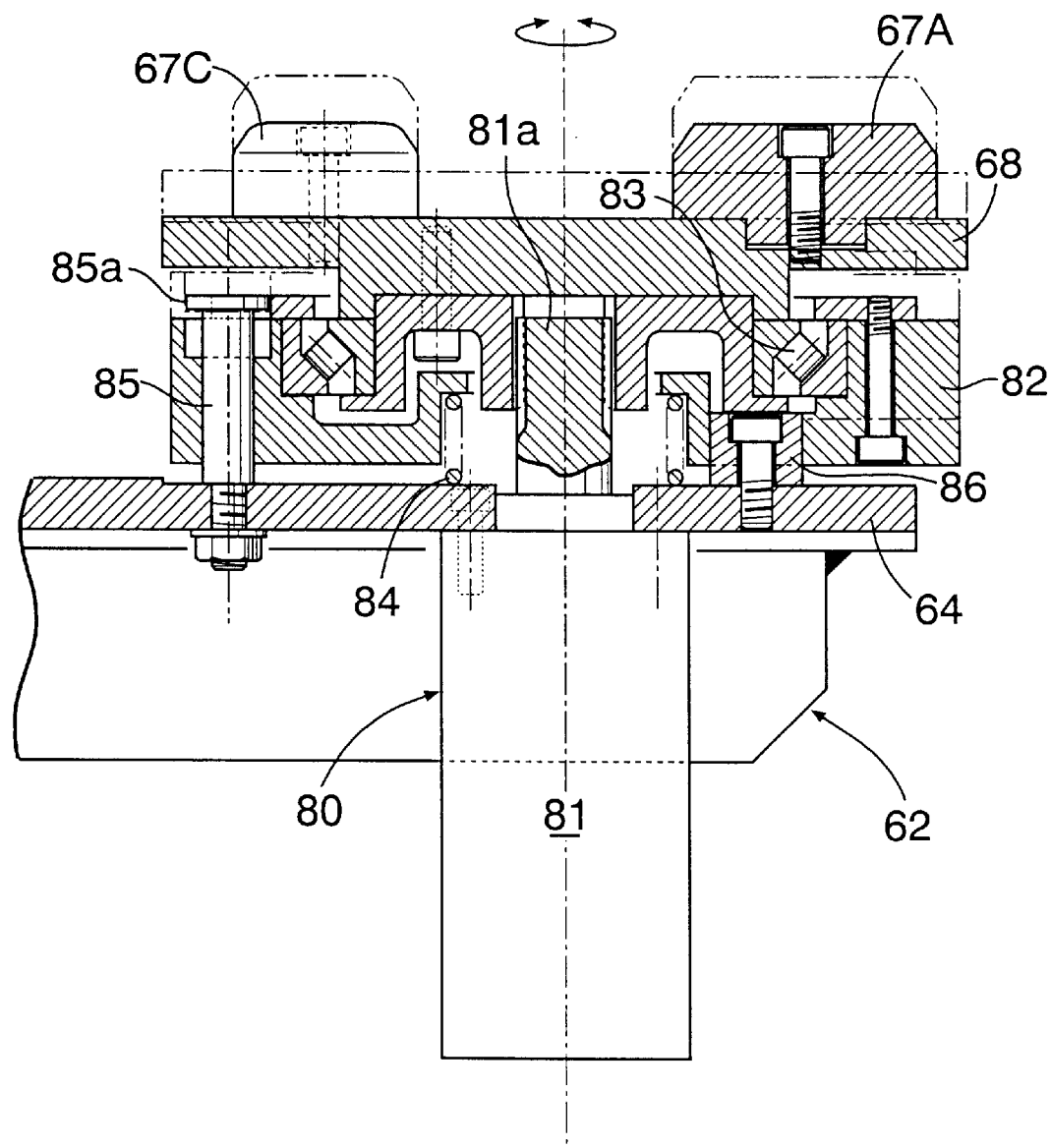
FIG. 10 is a sectional view taken along a line 10—10 in FIG. 6.

Referring also to FIGS. 9 and 10,the front clamp means 50 includes a plurality of, e.g., four support pins 67A, 67B, 67C and 67D capable of being fitted into lower ends of a plurality of, e.g., four types of the head pipes 25, respectively, a disk-shaped pin-supporting plate 68 for fixedly supporting one of the support pins 67A to 67D while disposing it at a location below the head pipe 25, a pushing member 69 which has, at its tip end, an engage portion 69a capable of being brought into engagement with the upper end of the head pipe 25 fitted at its lower end over one of the support pins 67A to 67D, irrespective of the type of the head pipe 25, and is capable of clamping the head pipe 25 between the pushing member 69 and one of the support pins 67A to 67D, and a cylinder 70 for providing pushing force for pushing the head pipe 25 from above to the pushing member 69.

The engage portion 69a is formed into a tapered shape on an outer peripheral surface of a tip end of the pushing member 69, so that it can be brought into insertion engagement with the upper end of the head pipe 25 in spite of a variation in inside diameter of the upper end of the head pipe 25. The pushing member 69 is attached at one end of an arm 71.

On the other hand, the cylinder 70 is fixed to a lower surface of the frame plate 64 in such a manner that an axis of the cylinder 70 is parallel to the axis of the head pipe 25, when the frame plate 64 of the movable support frame 62 has been brought into an attitude perpendicular to the axis of the head pipe 25. A connection member 72 connected to a tip end of a piston rod 70a provided in the cylinder 70 is connected to the other end of the arm 71 through a connecting pin 73 having an axis extending along the Y-axis.

The other end of the arm 71 is slidably fitted between a pair of cam plates 75, 75 secured to the frame plate 64 with a pair of spacers 74, 74 interposed therebetween, and cam bores 76, 76 are provided in the cam plates 75, 75 to correspond to each other.

Each of the cam bores 76 comprises a first bore portion 76a extending in parallel to the axis of the head pipe 25, and a second bore portion 76b connected to an upper end of the first bore portion 76a and inclined in a direction such that it is more spaced apart from the head pipe 25 at an upper location. Rollers 77, 77 are supported at an intermediate portion of the arm 71 above the connecting pin 73 and capable of being rolled movement within the cam bores 76, 76. Rollers 78, 78 are disposed below the rollers 77, 77 for rolling movement within the cam bores 76, 76 and supported at opposite ends of the connecting pin 73.

Figure 5:
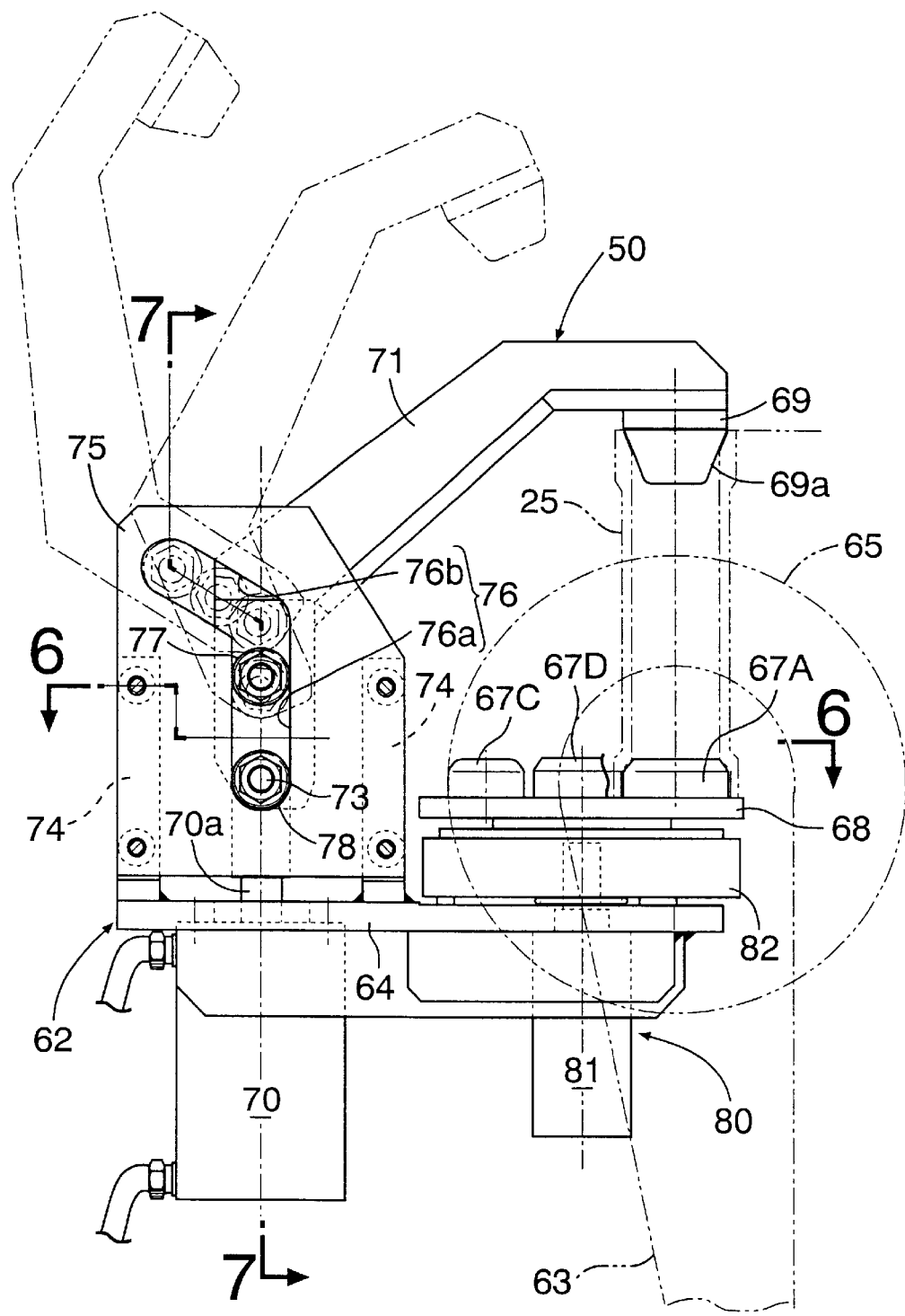
Figure 6:
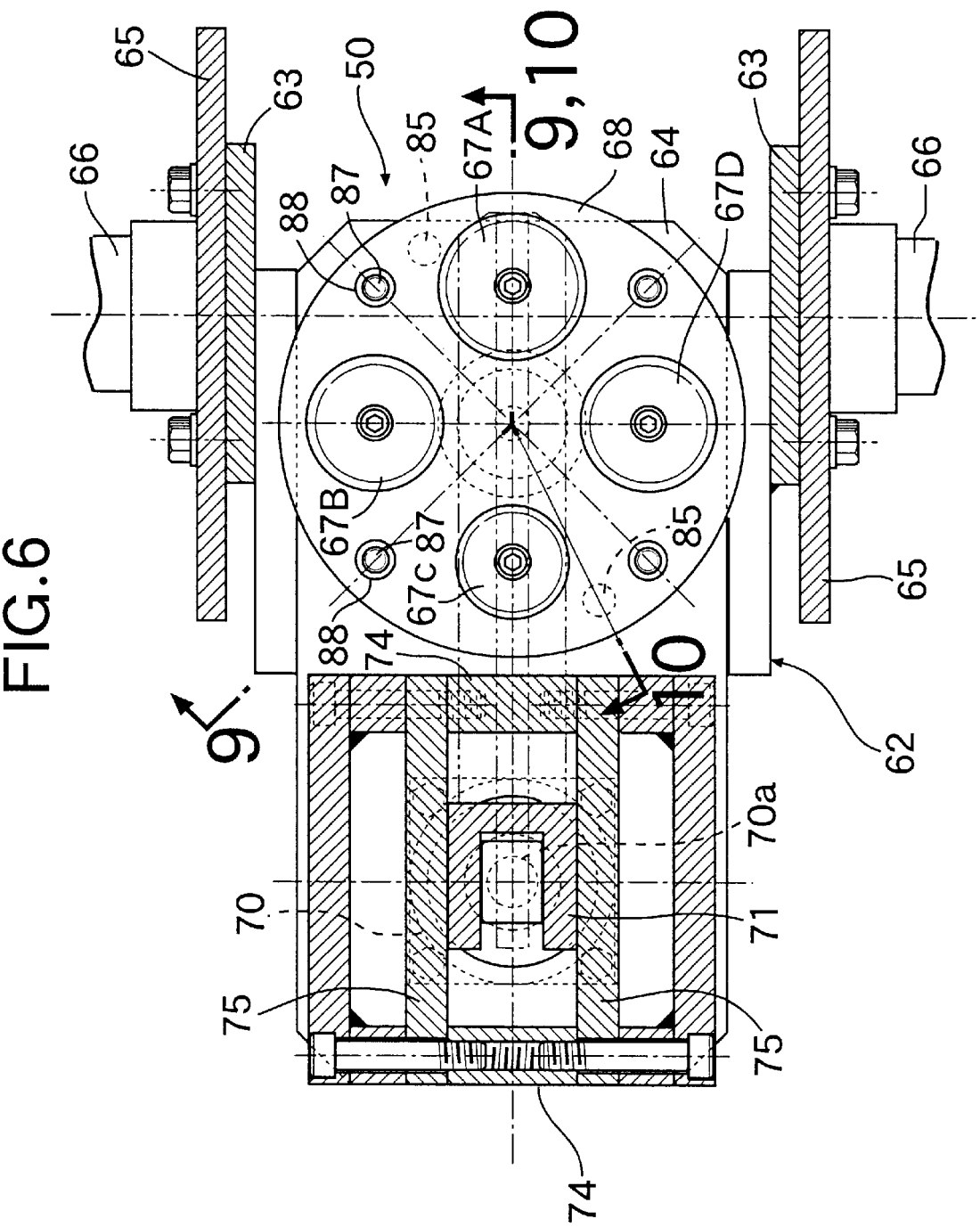
Figure 7:
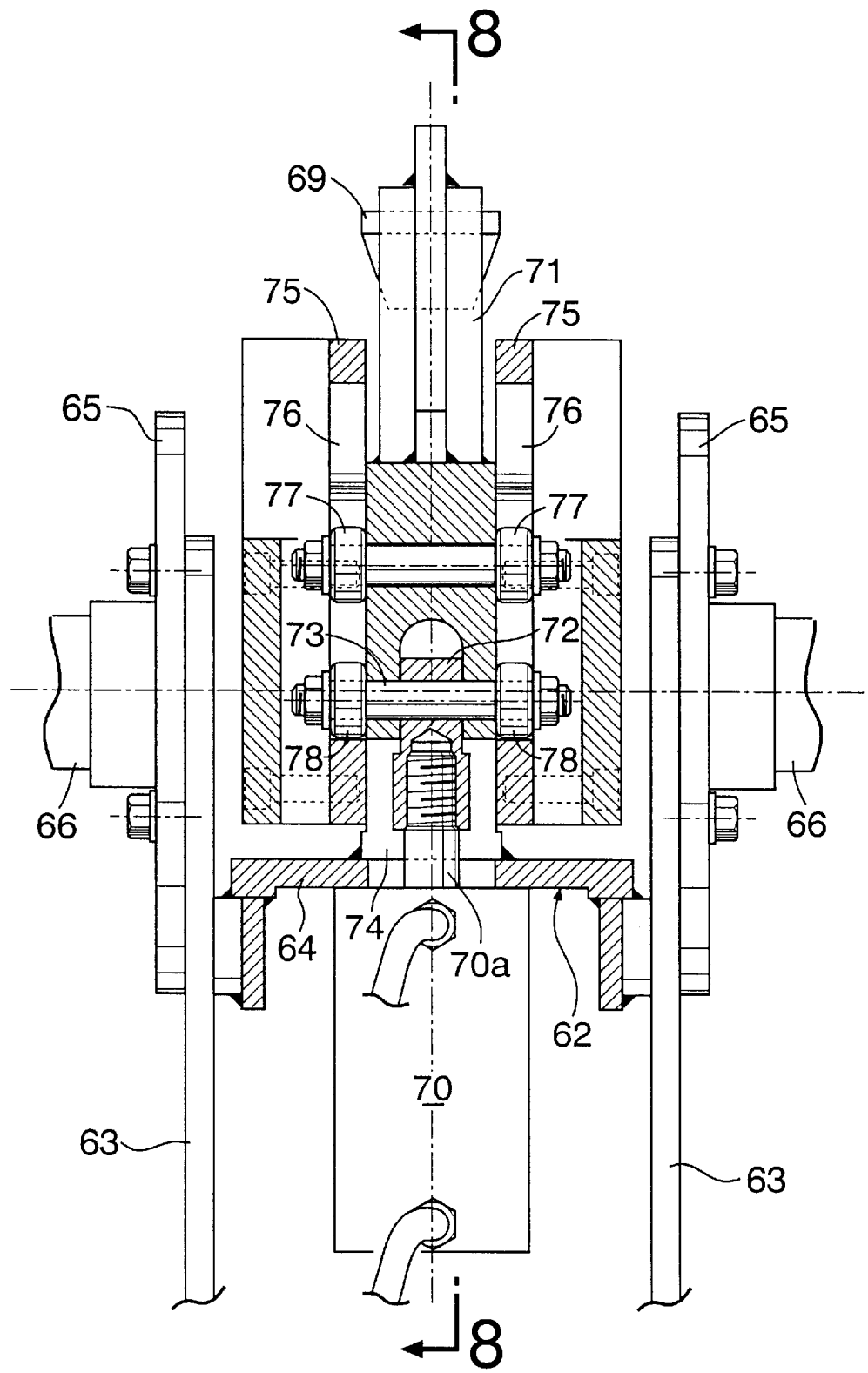
Figure 8:
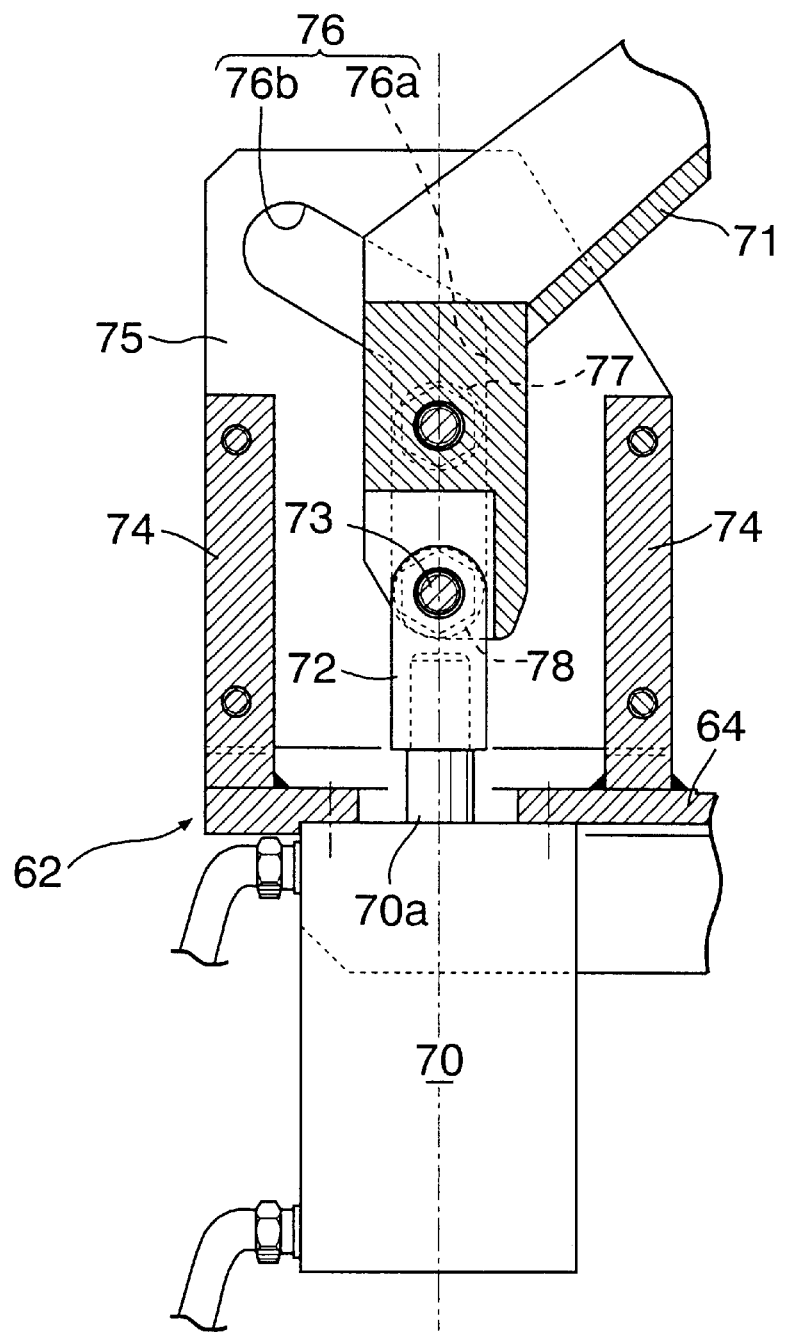

As the rollers 77, 77; 78, 78 are rolled within the cam bores 76, 76 by the expanding/contracting operation of the cylinder 70, the arm 71 is turned about the connecting pin 73, while being moved along with the connecting pin 73, as shown by dashed lines in FIG. 5. This causes the pushing member 69 mounted at one end of the arm 71 to be operated so as to clamp the head pipe 25 between the pushing member 69 and one of the support pins 67A to 67D.

The pin-supporting plate 68 is disposed at a location below the head pipe 25 for turning movement about an axis parallel to the axis of the head pipe 25. An index mechanism 80 is connected to the pin-support plate 68 in order to individually correspond to a plurality of types of the head pipes 25 and to alternatively bring one of the support pins 67A to 67D fixed at a plurality of points spaced apart from one another in a circumferential direction of the pin-supporting plate 68 to a position below the head pipe 25.

The index mechanism 80 includes an index motor 81 fixed to the frame plate 64, so that a turning force can be provided to the pin-supporting plate 68, and a floating support base 82, which is disposed between the pin-supporting plate 68 and the frame plate 64 for turnably supporting the pin-supporting plate 68. A bearing 83 is mounted between the pin-supporting plate 68 and the floating support base 82.

The index motor 81 has an output shaft 81a passed through a central portion of the floating support base 82 and spline-coupled to a central portion of the pin-supporting plate 68. Thus, the pin-supporting plate 68 is connected to the output shaft 81a of the index motor 81 for relative movement in an axial direction of the output shaft 81a and for non-relative rotation about the axis.

A coiled spring 84 is mounted between the floating support base 82 and the frame plate 64 to surround the output shaft 81a, so that the floating support base 82 and the pin-supporting plate 68 ate biased away from the frame plate 64 by a spring force of the spring 84. On the other hand, limiting shafts 85 are relatively slidably passed through the floating support base 82 at a plurality of points (two points in the present embodiment) circumferentially spaced apart from one another, and are fixed at their base ends to the frame plate 64, and integrally provided at their tip ends with limiting collars 85a capable of being brought into abutting engagement with a surface of the floating support base 82 opposite from the frame plate 64. The floating support base 82 is inhibited by the limiting shafts 85 from being rotated about the axis of the output shaft 81a, and ends of movement of the floating support base 82 and the pin-supporting plate 68 in a direction away from the frame plate 64 are defined by the limiting shafts 85. A stopper 86 is fixed to the frame plate 64 and passed through the floating support base 82 for relatively sliding movement in a direction parallel to the axis of the output shaft 81a, so that ends of movement of the floating support base 82 and the pin-supporting plate 68 in a direction toward the frame plate 64 are defined by the abutment of the pin-supporting plate 68 against the stopper 86.

The same number of guide tubes 88 as the number of the supporting pins 67A to 67D fixed to the pin-supporting plate 68 are provided on the pin-supporting plate 68 at locations equally spaced apart from one another in a circumferential direction of the pin-supporting plate 68. Guide pins 87 are fixed at their base ends to the frame plate 64 and capable of being fitted at their tip ends into the guide tubes 88, respectively. Each of the guide pins 87 is relatively slidably passed through the floating support base 82 in the axial direction.

Moreover, the length of each of the guide pins 87 is set such that it is out of corresponding one of the guide tubes 88 of the pin-supporting plate 68 in a state in which the floating support base 82 and the pin-supporting plate 68 have been moved to the maximum away from the frame plate 64, i.e., in a state in which the limiting collars 85a of the limiting shafts 85 have been brought into abutting engagement with the floating support base 82.

In such index mechanism 80, the pin-supporting plate 68 can be turned by the operation of the index motor 81 in a state in which no force is applied to the pin-supporting plate 68 from above and the floating support base 82 and the pin-supporting plate 68 have been moved to the maximum away from the frame plate 64 by the spring force of the spring 84. However, in a state in which the pin-supporting plate 68 and the floating support base 82 have been moved until the tip ends of the guide pins 87 has been fitted into the guide tubes 88 respectively by application of a force to the pin-supporting plate 68 from above, the pin-supporting plate 68 cannot be turned, whereby the relative positions of each of the supporting pins 67A to 67D and the head pipe 25 in the circumferential direction of the pin-supporting plate 68 can be retained.

Referring particularly to FIGS. 2 and 3, the rear support member-positioning device 48 is comprised of a rear positioning means 90 for positioning the rear support member 41 provided on the rear frame subassembly FR by utilizing the positioning bore 42 in the rear support member 41, and a rear positioning drive means 91 capable of moving the rear positioning means 90 in the directions of X-, Y- and Z-axes.

The rear positioning drive means 91 includes a rail 92 fixed on the base 44 to extend in the direction of the X-axis, a carriage 93 movable on the rail 92, an electric motor 94 fixedly disposed on the base 44 and having an axis extending in the direction of the X-axis, a screw feeding mechanism (not shown) provided between the electric motor 94 and the carriage 93 to convert the rotational force of the electric motor 94 into a linear driving force for the carriage 93 in the direction of the X-axis, a rail 95 provided on the carriage 93 and extending in the direction of the Z-axis, i.e., in a vertical direction, an elevator 96 capable of being lifted and lowered along the rail 95, an electric motor 97 fixedly disposed on the rail 95 and having an axis extending along the Z-axis, a screw feeding mechanism (not shown) provided between the electric motor 97 and the elevator 96 to convert the rotational force of the electric motor 97 into a linear driving force for the elevator 96 in the direction of the Z-axis, a rail 98 extending in the direction of the Y-axis and fixed to the elevator 96 to guide a movable support 100 on which the rear positioning means 90 is disposed, an electric motor 99 fixed to the rail 98 and having an axis extending along the Y-axis, and a screw feeding mechanism (not shown) provided between the electric motor 99 and the movable support 100.

With such rear positioning drive means 91, the movable support 100 for the rear positioning means 90 can be moved in the directions of the X-, Y- and Z-axes, i.e., in the longitudinal, widthwise and vertical directions of the vehicle body frame F. Thus, to accommodate changes in position and height of the rear support member 41 in the directions of X- and Y-axes according to a change in type of the vehicle body frame F, the rear positioning means 90 can be moved to any position corresponding to the position of the rear support member 41.

Figure 11:
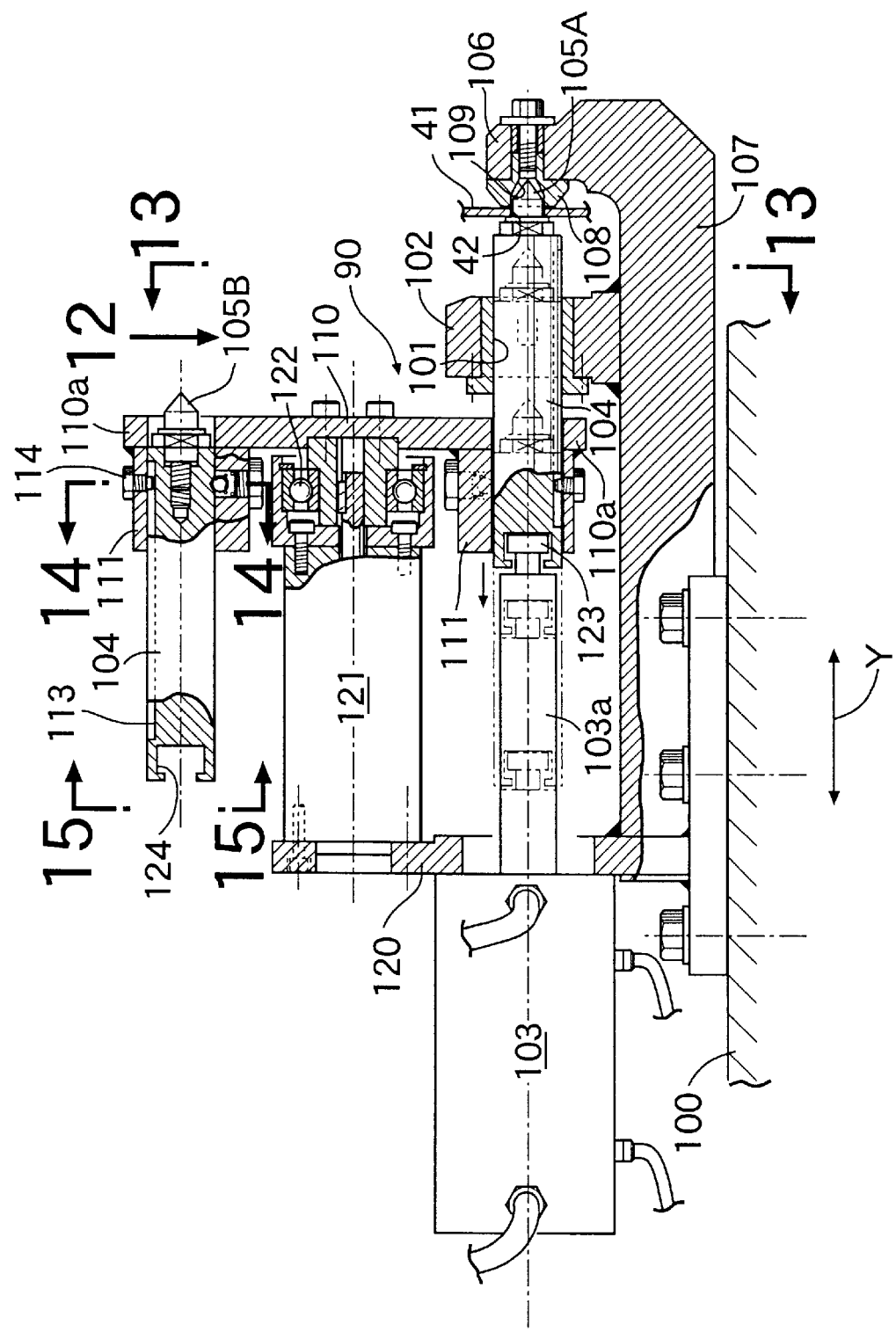
FIG. 11 is an enlarged sectional view taken along a line 11-11 in FIG. 3.
Figure 12:
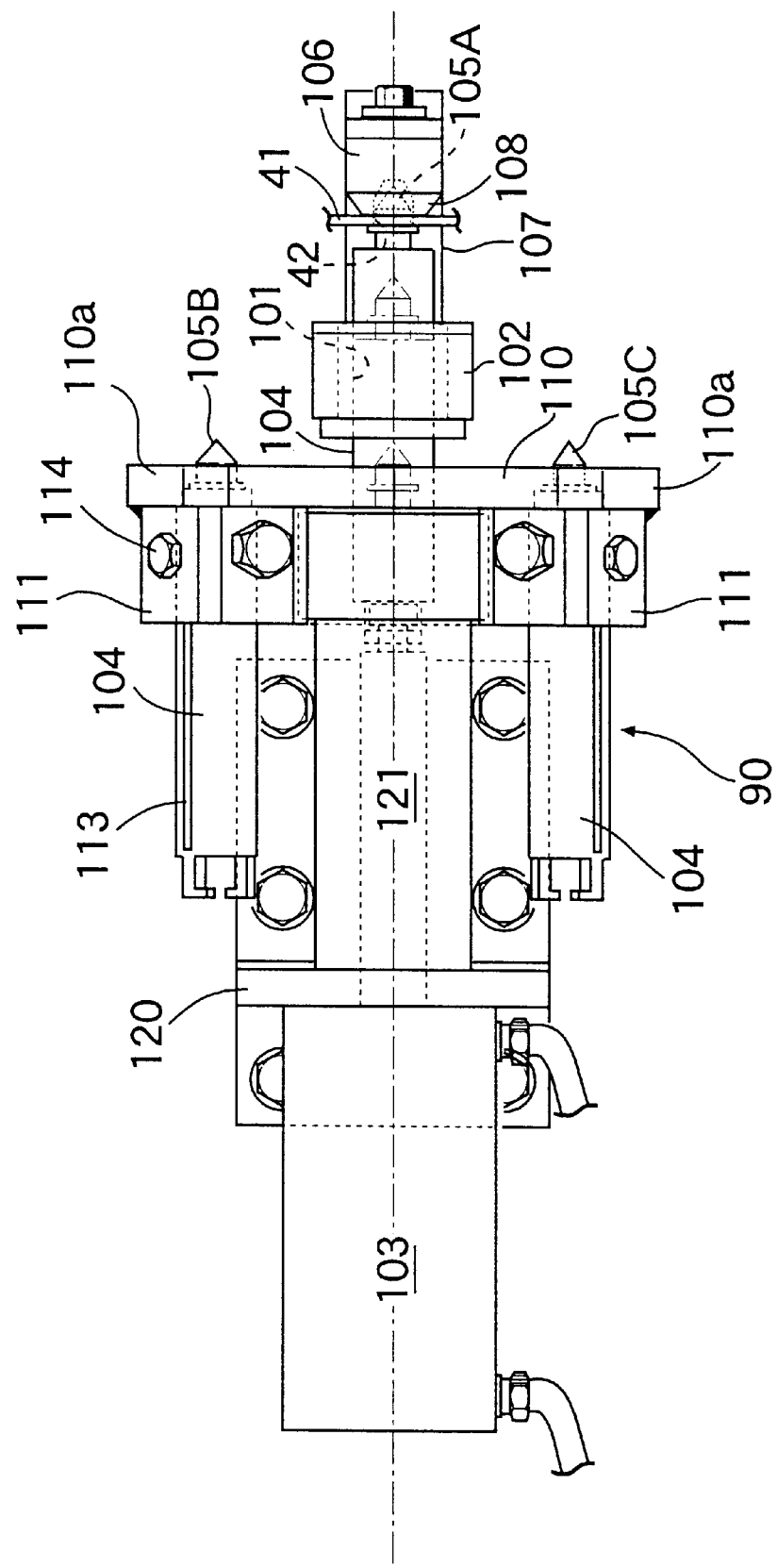
FIG. 12 is a view taken in the direction of an arrow 12 in FIG. 11.
Figure 13:
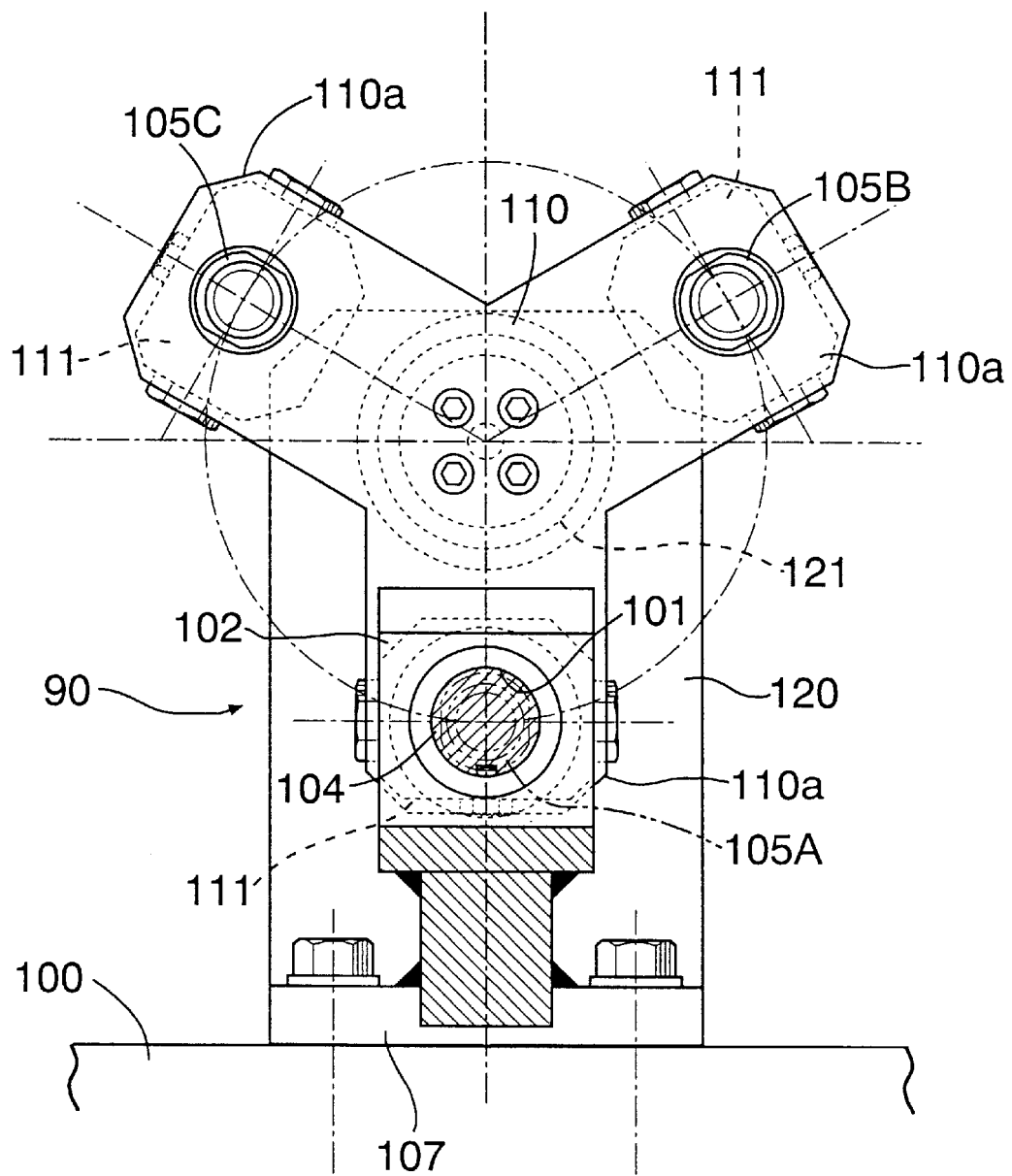
FIG. 13 is a sectional view taken along a line 13—13 in FIG. 11.

Referring to FIGS. 11 to 13, the rear positioning means 90 includes a guide wall 102 which has a guide bore 101 corresponding to the positioning bore 42 in the rear support member 41 and is capable of being opposed to an outer side surface of the rear support member 41 in a position where the guide bore 101 corresponds to the positioning bore 42, a cylinder 103 disposed coaxially with the axis of the guide bore 101 on a side of the guide wall 102 opposite from the rear support member 41, a plurality of, e.g., three types of movable rods 104 which are capable of being fitted into the guide bore 101 for selective interposition as well as removable insertion between the cylinder 103 and the guide wall 102, each of the movable rods being releasably connected at one end thereof to the cylinder 103, and a plurality of, e.g., three types of positioning pins 105A, 105B and 105C which are formed into such shapes that they can be fitted into the positioning bores 42 in the plurality of, e.g., three types of rear support members 41, respectively, and are individually fixed to the other ends of the movable rods 104.

A support arm 107 is secured to the movable support frame 100 to extend in the direction of the Y-axis, and includes the guide wall 102 and a support wall 106 disposed to sandwich the rear support members 41 between the support wall 106 and the guide wall 102. A receiving member 108 capable of clamping the rear support members 41 between the receiving member 108 and the positioning pins 105A, 105B and 105C is secured to the support wall 106, and has a bottomed receiving bore 109 provided therein for reception of the tip end of each of the positioning pins 105A, 105B and 105C.

A rod-supporting plate 110 is disposed between the guide wall 102 and the cylinder 103 for turning movement about an axis parallel to the axis of the guide bore 101. The rod-supporting plate 110 is formed into a substantially Y-shape, for example and includes a plurality of, e.g., three arm portions 110a at a plurality of, e.g., three circumferentially equally spaced-apart points, and the movable rods 104 are axially slidably retained on rod-retaining portions 111 provided at tip ends of the arm portions 110a, respectively.

Figure 14:
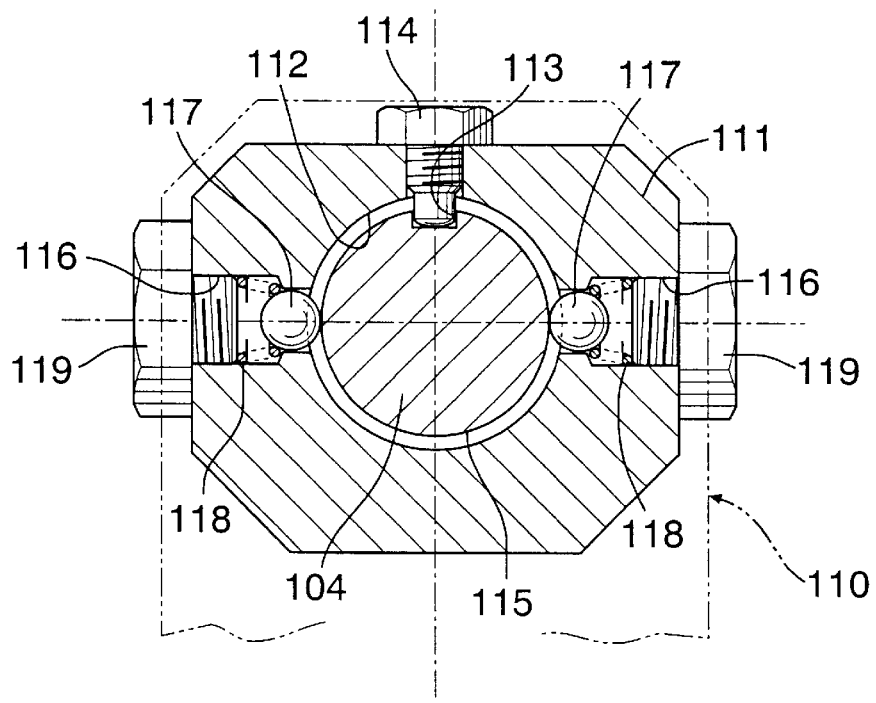
FIG. 14 is an enlarged sectional view taken along a line 14—14 in FIG. 11.

Referring to FIG. 14, each of the rod-retaining portions 111 has a slide bore 112 provided therein and having an axis parallel to the guide bore 101 in the guide wall 102, so that each of the movable rods 104 is slidably fitted in corresponding one of the slide bores 112. A single guide groove 113 is provided on an outer surface of each of the movable rods 104 to extend axially, and a screw member 114 is fitted at its tip end in the guide groove 113 and threadedly inserted into each of the rod-retaining portions 111. Thus, each of the movable rods 104 is retained on corresponding one of the rod-retaining portions 111 for sliding movement in an axial direction, but for non-rotation about the axis.

An annular groove 115 having a V-shape in cross section is provided in an outer surface of each of the movable rods 104 at a location close to the other end, i.e., at a location close to each of the positioning pins 105A, 105B and 105C. Each of the rod-retaining portions 111 has accommodating bores 116, 116 provided therein with their axes disposed on a diametrical line on each of the movable rods 104. Accommodated in the accommodating bores 116, 116 are a pair of spheres 117, 117 contacting with an outer surface of each of the movable rods 104, and springs 118, 118 for biasing the spheres 117, 117 toward the movable rod 104, and outer ends of the accommodating bores 116, 116 are closed by plugs 119, 119. Thus, when the movable rods 104 retract the positioning pins 105A, 105B and 105C mounted at the other ends thereof away from the receiving member 108, the spheres 117, 117 are brought into resilient engagement in the annular groove 115, whereby the positions of the movable rods 104 as retraction limits are maintained moderately.

The cylinder 103 is mounted on a mounting plate 120 provided on the support arm 107, and an index motor 121 is fixedly supported on the mounting plate 120 with its axis parallel to the guide bore 101 and is connected to the central portion of the rod-supporting plate 110 at equal distances to the movable rods 104. A bearing 122 is interposed between the rod-supporting plate 110 and the index motor 121. Thus, the rod-supporting plate 110 is driven in turning movement by the index motor 121 and turnably supported by the index motor 121, so that one of the movable rods 104 is alternatively brought to a position between the cylinder 103 and the guide bore 101 by the operation of the index motor 121.

Figure 15:
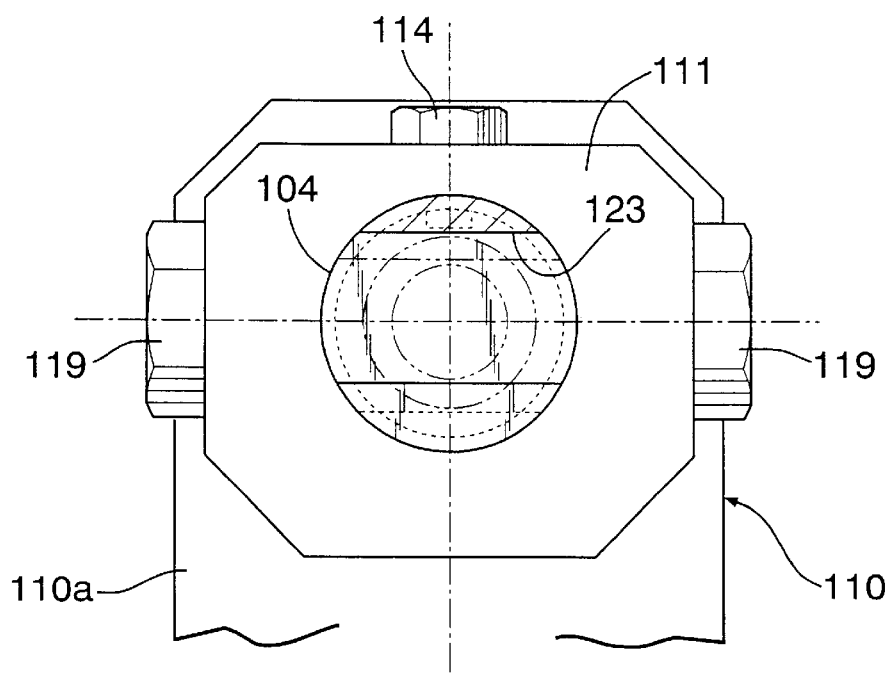
FIG. 15 is an enlarged sectional view taken along a line 15—15 in FIG. 11.

The piston rod 121a included in the index motor 121 is provided at its tip end with an engage portion 123 of a substantially T-shape in a vertical plane. A substantially T-shaped engage groove 124 is provided at one end of each of the movable rods 104, as shown in FIG. 15, in such a manner that when the movable rod 104 is turned in such a direction that it is disposed in the position between the cylinder 103 and the guide bore 101, the engage groove 124 is brought into engagement with the engage portion 123, and when the movable rod 104 is turned in such a direction that it leaves the position between the cylinder 103 and the guide bore 101, the engage groove 124 is disengaged from the engage portion 123.

Therefore, one of the movable rods 104 having the positioning pins 105A, 105B and 105C, which is selected and brought to the position between the cylinder 103 and the guide wall 102, is connected to the cylinder 103 and thus, is releasably fitted into the guide bore 101 in response to the expansion of the cylinder 103.

Referring particularly to FIGS. 2 and 3, the front support member-positioning device 46 comprises a first front positioning means 125 for positioning the front support member 32 included in the front frame subassembly FF by utilizing the positioning bore 34 in the front support member 32, and a first front positioning drive means 126 capable of moving the first front positioning means 125. The first front positioning means 125 is formed basically in the same manner as the rear positioning means 90 of the rear support member-positioning device 48.

The first front positioning drive means 126 is formed to move the first front positioning means 125 in the direction of at least the Y-axis of the X-, Y- and Z-axes. In the present embodiment, the first front positioning drive means 126 is formed to be able to move the first front positioning means 125 in the directions of the X- and Y-axes.

The reason why the first front positioning means 125 need not be moved in the directions of the X- and Z-axes as in the above way is that the positioning of the front support members 32, 32 included in the front frame subassembly FF is conducted by the front support member-positioning device 46 at a first step in the course of assembling of the vehicle body frame F, and that the vehicle body frame F is assembled with the front support members 32, 32 utilized as reference positions.

The down-tube positioning device 47 comprises a second front positioning means 127 for positioning the down-tube 27 included in the front frame subassembly FF by utilizing the positioning bore 36 in the down-tube 27, and a second front positioning drive means 128 capable of moving the second front positioning means 127. The second front positioning means 127 is formed basically in the same manner as the rear positioning means 90 of the rear support member-positioning device 48 and the first front positioning means 125 of the front support member-positioning device 46, and the second front positioning drive means 128 is formed to move the second front positioning means 127 in the directions of the X-, Y- and Z-axes.

The sheet rail retaining device 49 is comprised of a rear clamp means 130 for clamping the front portion of the sheet rail 28 included in the rear frame subassembly FR from above and below, and a rear clamp drive means 131 capable of moving the rear clamp means 130 in the directions of the X-, Y- and Z-axes.

The rear clamp drive means 131 includes a rail 132 fixed to the base 44 to extend in the direction of the X-axis, a carriage 133 movable on the rail 132, an electric motor 134 fixedly disposed on the base 44 and having an axis extending in the direction of the X-axis, a screw feeding mechanism (not shown) provided between the electric motor 134 and the carriage 133 to convert the rotational force of the electric motor 134 into a linear driving force for the carriage 133 in the direction of the X-axis, a rail 135 mounted on the carriage 133 to extend in the direction of the Z-axis, i.e., in the vertical direction, an elevator 136 capable of being lifted and lowered along the rail 135, an electric motor 137 fixedly disposed on the rail 135 and having an axis extending along the Z-axis, a screw feeding mechanism (not shown) provided between the electric motor 137 and the elevator 136 to convert the rotational force of the electric motor 137 into a linear driving force for the elevator 136 in the direction of the Z-axis, a rail 138 extending in the direction of the Y-axis and fixed to the elevator 136 to guide a movable support 140 on which the rear clamp means 130 is disposed, an electric motor 139 fixed to the rail 138 and having an axis extending along the Y-axis, and a screw feeding mechanism (not shown) provided between the electric motor 139 and the movable support 140.

With such rear clamping drive means 131, the movable support 140 for the rear clamp means 130 can be moved in the directions of the X-, Y- and Z-axes, i.e., in the longitudinal, widthwise and vertical directions of the vehicle body frame F. Thus, to accommodate variations in position and height in the direction of the sheet rail 28 in the X- and Y-axes in accordance with a change in type of the vehicle body frame F, the rear clamp means 130 can be moved to any position corresponding to the position of the sheet rail 28.

Figure 16:
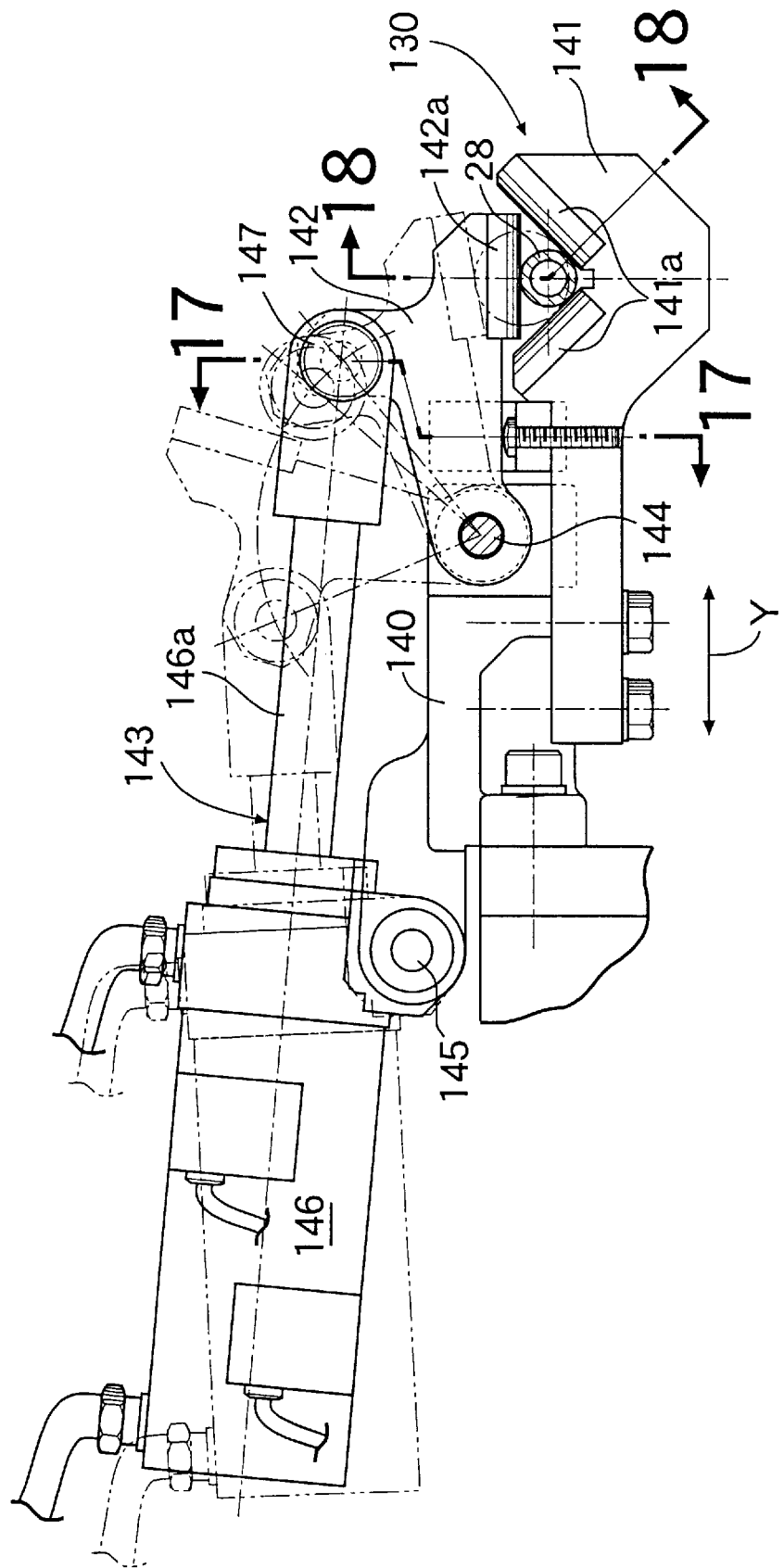
FIG. 16 is an enlarged view taken along a line 16—16 in FIG. 3.
Figure 17:
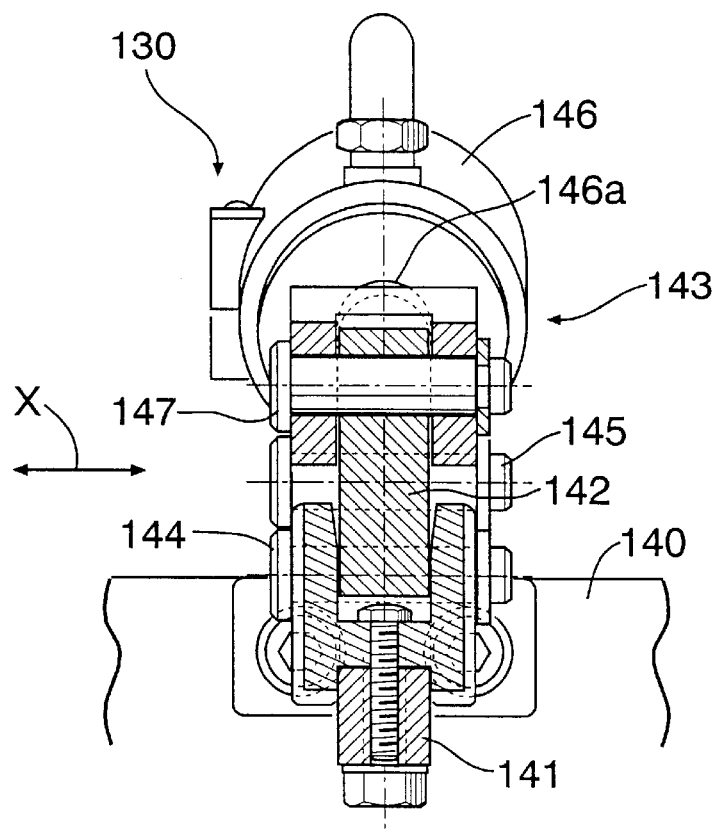
FIG. 17 is a sectional view taken along a line 17—17 in FIG. 16.
Figure 18:
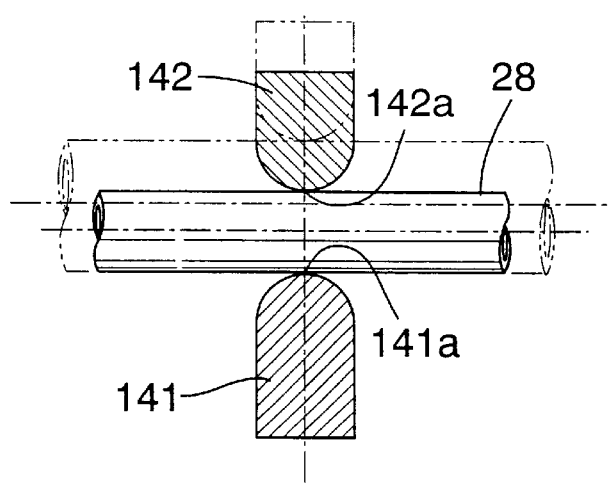
FIG. 18 is a sectional view taken along a line 18—18 in FIG. 16.

Referring to FIGS. 16 to 18, the rear clamp means 130 includes the movable support 140 capable of being moved in the longitudinal, widthwise and vertical directions of the vehicle body frame F by the rear clamp drive means 131 and being stopped in any position, a receiving member 141 formed into a substantially V-shape to open upwards in a plane intersecting a lengthwise direction of the sheet rail 28, and fixed to the movable support 140 so that it is disposed below the sheet rail 28, a pushing member 142 supported on the movable support 140 for swinging movement in such plane in such a manner that the sheet rail 28 is interposed between the pushing member 142 and the receiving member 141, and a drive mechanism 143 provided between the movable support 140 and the pushing member 142 to drive the pushing member 142 in swinging movement.

The pushing member 142 is turnably carried on the movable support 140 through a support shaft 144 having an axis extending along the X-axis. A surface 142a of the pushing member 142 opposed to the sheet rail 28 is formed into such a shape that it is brought into spherical contact with the sheet rail 28. A surface 141a of the receiving member 141 opposed to the sheet rail 28 is also formed into spherical contact with the sheet rail 28.

The drive mechanism 143 comprises a cylinder 146 which is swingably supported on the movable support 140 by a pin 145 parallel to the support shaft 144 and has a piston rod 146a connected to the pushing member 142 through a connecting pin 147 parallel to the support shaft 144 and the pin 145, so that the pushing member 142 is turned about the support shaft 144 in response to the expansion and contraction of the cylinder 146.

Figure 19:
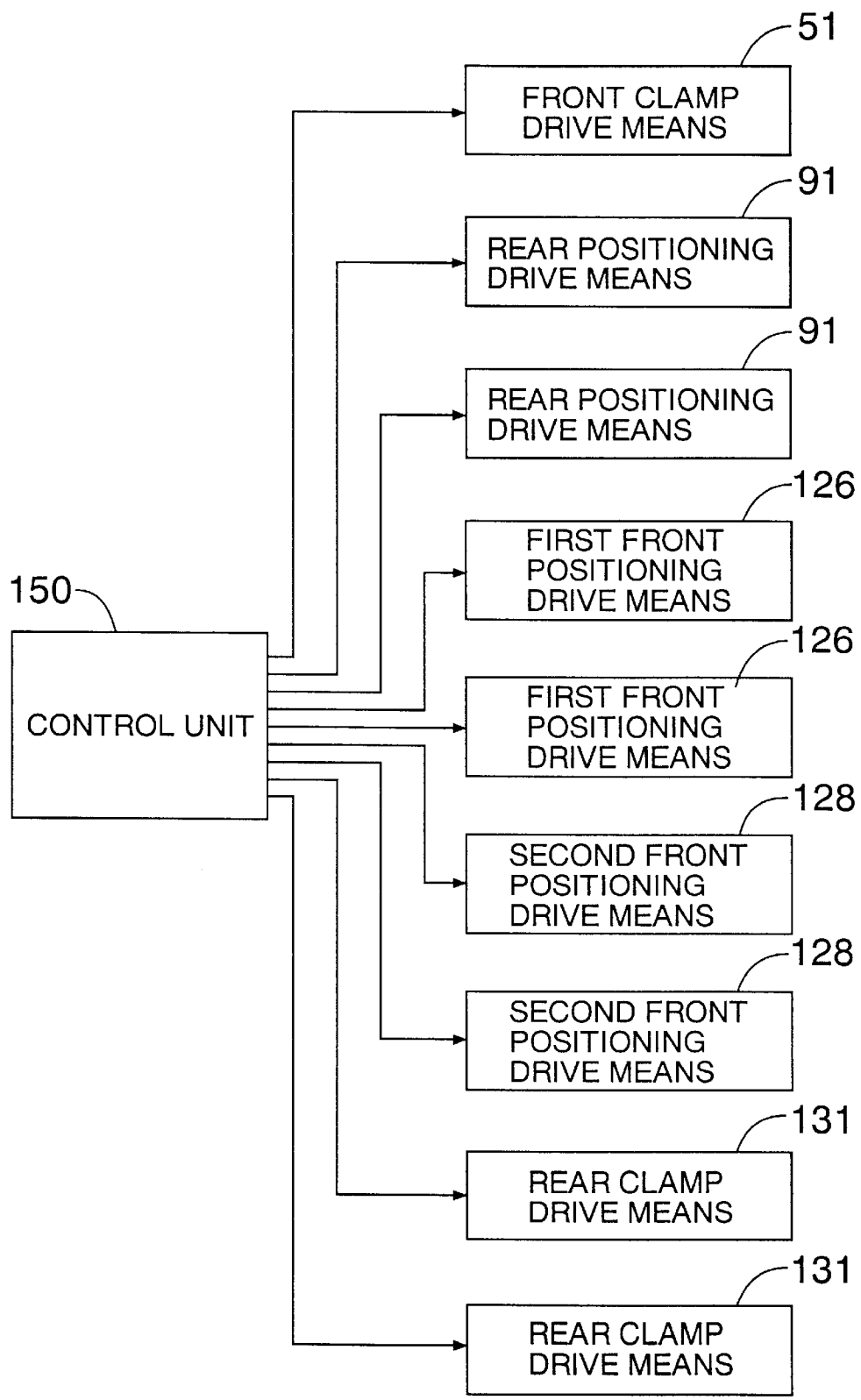
FIG. 19 is a block diagram showing the arrangement of a control system for the assembling apparatus.

Referring to FIG. 19, the operations of the front clamp drive means 51 in the head pipe retaining device 45, the first front positioning drive means 126, 126 in the pair of left and right front support member-positioning devices 46, 46, the second front positioning drive means 128, 128 in the pair of left and right down-tube positioning devices 47, 47, the rear positioning drive means 91, 91 in the pair of left and right rear support member-positioning devices 48, 48, and the rear clamp drive means 131, 131 in the pair of left and right sheet rail retaining device 49, 49 are controlled by a control unit 150.

The control unit 150 controls the operations of the drive means 51, 91, 91, 126, 126, 128, 128 and 131, 131, so that the front clamp means 50 in the head pipe retaining device 45, the first front positioning means 125, 125 in the front support member-positioning devices 46, 46, the second front positioning means 127, 127 in the down-tube positioning devices 47, 47, the rear positioning means 90, 90 in the rear support member-positioning devices 48, 48, and the rear clamp means 130, 130 in the sheet rail retaining device 49, 49 are brought to positions previously determined in accordance with the type of the vehicle body frame F to be assembled for the motorcycle. For this purpose, positional coordinates of various sites of the vehicle body frame F intended to be assembled are previously determined in a memory section included in the control unit 150 in correspondence to the type of the vehicle body frame F intended to be assembled, so that the operations of the drive means 51, 91, 91, 126, 126, 128, 128 and 131, 131 are controlled based on the positional coordinates of the sites read from the memory section in accordance with the type of the vehicle body frame F intended to be assembled.

The operation of the embodiment will be described below. In welding the front frame subassembly FF having the head pipe 25 at the front end and the rear frame subassembly FR to each other to assemble the vehicle body frame F for the motorcycle on the base 44, the following first to fifth steps are carried out:

At the first step, the front support member 32, 32 which are left and right rear portions of the front frame subassembly FF are positioned by the pair of first front positioning means 125, 125 movable at least in the direction of the Y-axis which is the widthwise direction of the vehicle body frame F and in the present embodiment, in the direction of the X-axis which is the longitudinal direction of the vehicle body framer F and in the direction of the Y-axis, and the down-tubes 27, 27 of the front frame subassembly FF are positioned by the pair of second front positioning means 127, 127 movable in the directions of the X- and Y-axes and also in the direction of the Z-axis which is the vertical direction of the vehicle body frame F. In this case, the front clamp means 50 capable of being moved in the directions of the Z- and X-axes and tilted about the axis extending along the Y-axis has also been disposed in the position corresponding to the head pipe 25, so that one of the supporting pins 67A to 67D included in the front clamp means 50 has been fitted into the lower end of the head pipe 25. Thus, in the front clamp means 50, a load has been applied to the pin-supporting plate 68 to cause the guide pins 87 to be fitted into the guide tubes 88, whereby the turned position of the pin-supporting plate 68 has been fixed.

At the second step, the head pipe 25 is clamped and retained from above and below by the front clamp means 50. Such first and second steps ensure that the front frame subassembly FF is positioned and supported.

Moreover, the pair of first front positioning means 125, 125 for positioning the left and right rear portions of the front frame subassembly FF are movable at least in the widthwise direction of the vehicle body frame F for the motorcycle, and the front clamp means 50 for clamping the head pipe 25 at the front end of the front frame subassembly FF is capable of being moved in the longitudinal and vertical directions of the vehicle body frame F for the motorcycle and tilted in the longitudinal direction. Therefore, in a state in which the left and right rear portions of the front frame subassembly FF have been positioned by the first front positioning means 125, 125, the changes in position and attitude of the head pipe 25 depending on the change in type of the front frame subassembly FF can be covered by the movement of the front clamp means 50 in the longitudinal and vertical directions and the tilting of the front clamp means 50 about the Y-axis, whereby the front frame subassembly FF can be positioned and supported with a good accuracy. In addition, the down-tubes 27, 27 of the front frame subassembly FF are positioned by the pair of second front positioning means 127, 127 movable in the directions of X-, Y- and Z-axes and hence, the positioning and supporting accuracy of the front frame subassembly FF can be further enhanced.

At the third step, the left and right rear portions of the rear frame subassembly FR are positioned by the pair of rear positioning means 90, 90 movable in the directions of X-, Y- and Z-axes. At the fourth step, the left and right front portions of the rear frame subassembly FR are clamped by the pair of rear clamp means 130,130 movable in the directions of X-, Y- and Z-axes.

As described above, the pair of rear positioning means 90, 90 for positioning the left and right rear portions of the rear frame subassembly FR are movable in the longitudinal, widthwise and vertical directions of the vehicle body frame F for the motorcycle, and the pair of rear clamp means 130,130 for clamping the left and right front portions of the rear frame subassembly FR are movable in the longitudinal, widthwise and vertical directions of the vehicle body frame F for the motorcycle. Thus, even if the type of the rear frame subassembly FR is changed the rear frame subassembly FR can be positioned and supported with a good accuracy relative to the front frame subassembly FF, thereby providing general-purpose properties to accommodate the assembling of any of a plurality of types of vehicle body frames F for motorcycles, thus reducing the equipment cost.

At the fifth step, the front and rear frame subassemblies FF and FR positioned relative to each other are welded to each other to assemble the vehicle body frame F. In this case, the vehicle body frame F can be assembled with a stable welding accuracy by welding the front and rear frame subassemblies FF and FR positioned with a good accuracy relative to each other. In addition, the rear frame subassembly FR is restrained, while being positioned with a good accuracy relative to the front frame subassembly FF, by the pair of rear positioning means 90, 90 and the pair of rear clamp means 130, 130. Therefore, even if a welding strain has been produced in the rear frame subassembly FR, such strain can be corrected to assemble the vehicle body frame F for the motorcycle with a good accuracy.

It should be noted here that the operations of the pair of front positioning drive means 126, 126 for moving the pair of the first front positioning means 125, 125 in the directions of X- and Y-axes, the operations of the pair of the second front positioning drive means 128, 128 for moving the pair of second front positioning means 127, 127 in the directions of the X-, Y- and X-axes, the operations of the front clamp drive means 51 for moving the front clamp means 50 in the directions of the Z- and X-axes and tilting the front clamp means 50 about the axis extending along the Y-axis, the operations of the pair of rear positioning drive means 91, 91 for moving the pair of rear positioning means 90, 90 in the directions of the X-, Y- and Z-axes, and the operations of the pair of rear clamp drive means 131, 131 for moving the pair of rear clamp means 130, 130 in the directions of the X-, Y- and Z-axes are controlled by the control unit 150, so that the first front positioning means 125, 125, the second front positioning means 128, 128, the front clamp means 50, the rear positioning means 90, 90 and the rear clamp means 130, 130 are brought to the positions previously determined depending on the type of the vehicle body frame F for the motorcycle, which is to be assembled.

Therefore, in accordance with the change in type of the vehicle body frame F for the motorcycle, which is to be assembled, the first front positioning means 125, 125, the second front positioning means 128, 128, the front clamp means 50, the rear positioning means 90, 90 and the rear clamp means 130, 130 are brought automatically to the positions corresponding to the vehicle body frame F, and thus, the efficiency of assembling of the vehicle body frame F for the motorcycle can be enhanced.

The head pipe retaining device 45 for clamping and retaining the head pipe 25 provided at the front end of the front frame subassembly FF includes the plurality of supporting pins 67A, 67B, 67C and 67D capable of being fitted into the lower ends of the plurality of types of the head pipes 25, respectively, the pin-supporting plate 68 for fixedly supporting one of the supporting pins 67A, 67B, 67C and 67D, while disposing it in the position below the head pipe 25, the pushing member 69 which can be brought into engagement with the upper end of the head pipe 25 fitted at its lower end over one of the supporting pins 67A, 67B, 67C and 67D, irrespective of the type of the head pipe 25, and is capable of clamping the head pipe 25 between the pushing member 69 itself and one of the supporting pins 67A, 67B, 67C and 67D, and the cylinder 70 for providing, to the pushing member 69, the pushing force for pushing the head pipe 25 from above.

Therefore, any of the plurality of types of the head pipes 25 can be clamped between one of the supporting pins 67A, 67B, 67C and 67D selected depending on the type of the head pipe 25 to be retained and the pushing member 69 corresponding to the type of the head pipe 25, and thus, the general-purpose properties can be provided to the head pipe retaining device 45 to accommodate the assembling of any of the plurality of types of vehicle body frames F for motorcycles, thereby providing a reduction in equipment cost.

In addition, the piston rod 70a of the cylinder 70 disposed in the fixed position and having the axis parallel to the axis of the head pipe 25 is connected to the other end of the arm 71 having the pushing member 69 mounted at one end thereof through the connecting pin 73. The cam plates 75, 75 are fixedly disposed on the movable support frame 62 with its position fixed relative to the cylinder 70 and have the cam bores 76, 76 each comprising the first bore portion 76a extending in parallel to the axis of the head pipe 25 and the second bore portion 76b connected to the upper end of the first bore portion 76a and inclined in the direction such that it is more spaced apart from the head pipe 25 at the upper location. The rollers 77, 77 capable of being rolled within the cam bores 76, 76 are supported at the intermediate portion of the arm 71.

Therefore, as the rollers 77, 77 are rolled within the cam bores 76, 76 in response to the expansion and contraction of the cylinder 70, the arm 71 is turned about the connecting pin 73, while being moved along with the connecting pin 73. In this case, the lower portion of the cam bore 76 is defined as the first bore portion 76a extending in parallel to the axis of the head pipe 25, and when the roller 77 is rolled within the first bore portion 76a, the arm 71 and thus the pushing member 69 are also moved in parallel to the axis of the head pipe 25. Therefore, when the upper end of the head pipe 25 is pushed by the pushing member 69, the movement of the pushing member 69 can be in the direction along the axis of the head pipe 25 and hence, the head pipe 25 can be clamped stably and reliably between one of the supporting pins 67A, 67B, 67C and 67D and the pushing member 69, irrespective of a variation in length of the head pipe 25.

Moreover, the supporting pins 67A, 67B, 67C and 67D individually corresponding to the plurality of types of the head pipes 25 are fixed to the pin-supporting plate 68 disposed at the location below the head pipe 25 for turning movement about the axis parallel to the axis of the head pipe 25, so that they are disposed at the plurality of locations equally spaced apart from one another in the circumferential direction of the pin-supporting plate 68, and the index mechanism 80 for alternatively bringing one of the supporting pins 67A, 67B, 67C and 67D to the position below the head pipe 25 is connected to the pin-supporting plate 68. Therefore, one of the supporting pins 67A, 67B, 67C and 67D corresponding to the head pipe 25 can be selected automatically in accordance with the change in type of the vehicle body frame F for the motorcycle, to be assembled, and brought below the head pipe 25, leading to an enhanced assembling efficiency.

The sheet rail-retaining device 49 for clamping and retaining the pipe-shaped sheet rail 28 forming a portion of the vehicle body frame F for the motorcycle and extending in the substantially longitudinal direction of the vehicle body frame F includes the movable support 140 which is capable of being moved in the longitudinal, widthwise and vertical directions of the vehicle body frame F and stopped at any position, the receiving member 141 formed into the substantially V-shape to open upwards in the plane intersecting the direction of the lengthwise direction of the sheet rail 28 and fixed to the movable support 140 so as to be disposed below the sheet rail 28, the pushing member 142 supported on the movable support 140 for swinging movement within such plane to sandwich the sheet rail 28 between the pushing member 142 and the receiving member 141, and the drive mechanism 143 provided between the movable support 140 and the pushing member 142 to drive the pushing member 142 in swinging movement.

Therefore, by fixedly disposing the receiving member 141 below the sheet rail 28 at a location corresponding to the type of the sheet rail 28 to be clamped, and swinging the pushing member 142 to sandwich the sheet rail 28 between the pushing member 142 and the receiving member 141, the sheet rail 28 can be clamped irrespective of a variation in outside diameter of the sheet rail 28.

The surfaces of the receiving member 141 and the pushing member 142 opposed to the sheet rail 28 are formed into such shapes that they are brought into spherical contact with the sheet rail 28 and hence, even if the angle formed by the lengthwise direction of the sheet rail 28 and the plane in which the receiving member 141 and the pushing member 142 are disposed is changed to some extent, the sheet rail 28 can be reliably clamped between the receiving member 141 and the pushing member 142.

Therefore, it is possible to provide the general-purpose properties to the seat rail-retaining device 49 to accommodate the assembling of any of the plurality of types of vehicle body frames F for motorcycles, thereby reducing the equipment cost.

The rear support member-positioning device 48 for positioning the rear support member 41 forming a portion of the vehicle body frame F for the motorcycle and having the positioning bore 42 extending in the widthwise direction of the vehicle body frame F by utilizing the positioning bore 42 includes the guide wall 102 having the guide bore 101 and capable of being opposed to the outer side surface of the rear support member 41 in the position where the guide bore 101 corresponds to the positioning bore 42, the cylinder 103 disposed coaxially with the axis of the guide bore 101 on the side of the guide wall 102 opposite from the rear support member 41, the plurality of movable rods 104 which are capable of being fitted into the guide bore 101 for selective interposition as well as removable insertion between the cylinder 103 and the guide wall 102, each of the movable rods being releasably connected at one end thereof to the cylinder 103, and the plurality of types of positioning pins 105A, 105B and 105C which are formed into such shapes that they can be fitted into the positioning bores 42 in the plurality of types of rear support members 41, respectively, and are individually fixed to the other ends of the movable rods 104.

Therefore, one of the plurality of movable rods 104, which has the positioning pin 105A, 105B, 105C corresponding to the rear support member 41 to be positioned, is selected and brought to the position between the cylinder 103 and the guide wall 102 and removably fitted into the guide bore 101 by connection with the cylinder 103, and the positioning pin corresponding to the positioning bore 42 in the rear support member 41 to be positioned can be fitted properly into the guide bore 101 to position the rear support member 41. Thus, it is possible to provide the general-purpose properties to the rear support member-positioning device 48 to accommodate the assembling of any of the plurality of types of vehicle body frames for motorcycles, thereby providing a reduction in equipment cost.

Further, the movable rods 104 are disposed at locations equally spaced apart from one another in the circumferential direction of the rod-supporting plate 110 disposed between the guide wall 102 and the cylinder 103 for turning movement about the axis parallel to the axis of the guide bore 101, and are retained on the rod-supporting plate 110 for sliding movement in the direction parallel to the axis of the guide bore 101. The index motor 121 is connected to the rod-supporting plate 110 for driving the rod-supporting plate 110 in turning movement, so that one of the movable rods 104 can be alternatively brought to a position between the cylinder 103 and the guide bore 101.

Therefore, it is possible to provide, in a simple structure, an arrangement designed so that one of the plurality of types of positioning pins 105A, 105B and 105C can be selected in correspondence to the rear support member 41 to be positioned and can be brought to a position where it corresponds to the guide bore 101 with a good accuracy.

Further, the front support member-positioning device 46 for positioning the front support member 32 forming a portion of the vehicle body frame F for the motorcycle and having the positioning bore 34 extending in the widthwise direction of the vehicle body frame F by utilizing the positioning bore 34, as well as the down-tube positioning device 47 for positioning the down-tube 27 forming a portion of the vehicle body frame F for the motorcycle and having the positioning bore 36 extending in the widthwise direction of the vehicle body frame F by utilizing the positioning bore 36 is formed in a similar manner to the rear support member-positioning device 48. Thus, it is possible to provide the general-purpose properties to the front support member-positioning device 46 and the down-tube positioning device 47 to accommodate the assembling of any of the plurality of types of vehicle body frames F for motorcycles, thereby providing a reduction in equipment cost.

Although the embodiment of the present invention has been described in detail, it will be understood that the present invention is not limited to the above-described embodiment, and various modifications in design may be made without departing from the spirit and scope of the invention defined in claims.

For example, in the embodiment, the front support members 32, 32 which are the left and right rear portions of the front frame subassembly FF are positioned by the pair of first front positioning means 125, 125, and the down-tubes 27, 27 of the front frame subassembly FF are positioned by the pair of second front positioning means 127, 127 at the first step. However, the positioning of the down-tubes 27, 27 of the front frame subassembly FF by the pair of second front positioning means 127, 127 may be omitted, and at least the left and right rear portions of the front frame subassembly FF may be positioned.

What is claimed is:

1. An apparatus for assembling a vehicle body frame for a motorcycle by welding a front frame subassembly having a head pipe at a front end thereof and a rear frame subassembly to each other, comprising a pair of front positioning means capable of positioning left and right rear portions of the front frame subassembly, a front clamp means capable of clamping the head pipe at the front end of the front frame subassembly, a pair of rear positioning means capable of positioning left and right rear portions of the rear frame subassembly, a pair of rear clamp means capable of clamping left and right front portions of the rear frame subassembly, a pair of front positioning drive means for moving said front positioning means at least in a direction of a Y-axis established in a widthwise direction of said vehicle body frame, respectively, a front clamp drive means which is capable of moving said front clamp means in directions of Z- and X-axes established in vertical and longitudinal directions of said vehicle body frame and is capable of tilting said front clamp means about an axis extending along the Y-axis, a pair of rear positioning drive means capable of moving said rear positioning means in the directions of X-, Y- and Z-axes, respectively, a pair of rear clamp drive means capable of moving said rear clamp means in the directions of X-, Y- and Z-axes, respectively, and a control unit for controlling the operations of said drive means, so that said front positioning means, said front clamp means, said rear positioning means and said rear clamp means are brought into positions previously determined depending on the type of the vehicle body frame for the motorcycle, which is to be assembled.

2. An apparatus for assembling a vehicle body frame for a motorcycle according to claim 1, wherein said front clamp means includes a plurality of supporting pins capable of being fitted into lower ends of a plurality of types of head pipes, a pin-supporting plate for fixedly supporting one of said supporting pins, while disposing said one of the pins at a location below the head pipe, a pushing member capable of being brought into engagement with an upper end of the head pipe fitted at a lower end thereof over said one of the supporting pins, irrespective of the type of the head pipe, thereby clamping said head pipe between said pushing member and said one of the supporting pins, and a cylinder for providing pushing force for pushing said head pipe from above to said pushing member.

3. An apparatus for assembling a vehicle body frame for a motorcycle according to claim 2, further including an arm, at one end of which said pushing member is mounted, said cylinder being disposed at a fixed position to have an axis parallel to an axis of the head pipe and connected to the other end of said arm through a connecting pin, a cam plate fixedly disposed with a position thereof fixed relative to said cylinder, and having a cam bore comprising a first bore portion extending in parallel to the axis of said head pipe, and a second bore portion connected to an upper end of said first bore portion and inclined in such a direction that said second bore portion is more spaced apart from said head pipe at an upper location, and a roller supported at an intermediate portion of said arm and capable of being rolled within said cam bore.

4. An apparatus for assembling a vehicle body frame for a motorcycle according to claim 2 or 3, wherein said pin-supporting plate is disposed at a location below said head pipe for turning movement about the axis parallel to the axis of said head pipe; said supporting pins individually corresponding to the plurality of types of head pipes are fixed to said supporting plate, so that said supporting pins are disposed at a plurality of locations equally spaced apart from one another in a circumferential direction of said pin-supporting plate; and said apparatus further includes an index mechanism connected to said pin-supporting plate to alternatively bring one of the plurality of supporting pins to a position below said head pipe.

5. An apparatus for assembling a vehicle body frame for a motorcycle according to claim 1, wherein each of said front positioning means and said rear positioning means includes a guide wall which has a guide bore corresponding to a positioning bore provided in a positioned member forming a portion of said front frame subassembly or said rear frame subassembly to extend in a widthwise direction of said vehicle body frame, said guide wall being opposed to an outer side surface of said positioned member in a position where said guide bore corresponds to said positioning bore, a cylinder disposed coaxially with an axis of said guide bore on a side of said guide wall opposite from said positioned member, a plurality of movable rods which are capable of being fitted into said guide bore for selective interposition as well as removable insertion between said cylinder and said guide wall, each of said movable rods being releasably connected at one end thereof to said cylinder, and a plurality of types of positioning pins, each of which is formed into such a shape as to be capable of fitting into the positioning bore in any of a plurality of types of said positioned members, said positioning pins being individually fixed to the other ends of said movable rods.

6. An apparatus for assembling a vehicle body frame for a motorcycle according to claim 5, further including a rod-supporting plate disposed between said guide wall and said cylinder for turning movement about an axis parallel to the axis of said guide bore; said movable rods being disposed at locations equally spaced apart from one another in the circumferential direction of said rod-supporting plate and retained on said rod-supporting plate for sliding movement in a direction parallel to the axis of said guide bore, and an index motor connected to said rod-supporting plate for driving said rod-supporting plate in turning movement, so that one of said movable rods can be alternatively brought to a position between said cylinder and said guide bore.

7. An apparatus for assembling a vehicle body frame for a motorcycle according to claim 1, wherein said rear clamp means formed to clamp and retain a pipe-shaped frame member forming a portion of said vehicle body frame and extending in the substantially longitudinal direction of said vehicle body frame includes a movable support which is capable of being moved in the longitudinal, widthwise and vertical directions of said vehicle body frame and is capable of being stopped at any position, a receiving member which is formed into a substantially V-shape to open upwards in a plane intersecting a lengthwise direction of said frame member, and is fixed to said movable support so as to be disposed below said frame member, a pushing member supported on said movable support for swinging movement in said plane to sandwich said frame member between said pushing member and said receiving member, and a drive mechanism provided between said movable support and said pushing member to drive said pushing member in swinging movement, each of surfaces of said receiving member and said pushing member opposed to said frame member being formed into such a shape as to be brought into spherical contact with said frame member.

* * * * *